US012648048B2

(12) United States Patent
Park et al.

(10) Patent No.: US 12,648,048 B2
(45) Date of Patent: Jun. 2, 2026

(54) METHOD AND DEVICE FOR PERFORMING SL DRX OPERATION IN NR V2X

(71) Applicant: LG ELECTRONICS INC., Seoul (KR)

(72) Inventors: Giwon Park, Seoul (KR); Hanbyul Seo, Seoul (KR); Seoyoung Back, Seoul (KR); Seungmin Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 18/554,854

(22) PCT Filed: Apr. 14, 2022

(86) PCT No.: PCT/KR2022/005395
§ 371 (c)(1),
(2) Date: Oct. 11, 2023

(87) PCT Pub. No.: WO2022/220607
PCT Pub. Date: Oct. 20, 2022

(65) Prior Publication Data
US 2024/0121858 A1     Apr. 11, 2024

Related U.S. Application Data

(60) Provisional application No. 63/174,996, filed on Apr. 14, 2021.

(51) Int. Cl.
*H04W 76/28*          (2018.01)
*H04W 92/18*          (2009.01)

(52) U.S. Cl.
CPC ............ *H04W 76/28* (2018.02); *H04W 92/18* (2013.01)

(58) Field of Classification Search
CPC ........ H04L 1/1883; H04L 67/12; H04W 4/40; H04W 72/25; H04W 76/28; H04W 92/18; Y02D 30/70
See application file for complete search history.

(56) References Cited

U.S. PATENT DOCUMENTS

2022/0095326 A1*  3/2022  Li .......................... H04L 1/1896
2023/0068554 A1*  3/2023  Yang ................. H04W 52/0216
(Continued)

FOREIGN PATENT DOCUMENTS

KR      1020200093517         8/2020

OTHER PUBLICATIONS

PCT International Application No. PCT/KR2022/005395, International Search Report dated Jul. 25, 2022, 3 pages.
(Continued)

*Primary Examiner* — Awet Haile
(74) *Attorney, Agent, or Firm* — LEE, HONG, DEGERMAN, KANG & WAIMEY

(57) ABSTRACT

Proposed are a method for a first device to perform wireless communication and a device for supporting same. The method may comprise the steps of: acquiring an SL DRX configuration including information related to an active time of the first device; receiving first SCI from a second device through a physical sidelink control channel (PSCCH) outside the active time of the first device, the first CSI being for scheduling a PSSCH and second SCI; and receiving the second SCI from the second device through the PSSCH outside the activation time of the first device, the second SCI including information related to a source ID of the second device and information related to a destination ID of the second device.

15 Claims, 15 Drawing Sheets

(56)                    References Cited

U.S. PATENT DOCUMENTS

2023/0189220 A1\*   6/2023  Liu ....................... H04W 72/04
                                               370/329
2023/0328840 A1\*  10/2023  Cheng .............. H04W 52/0219
                                               370/329
2024/0373445 A1\*  11/2024  Zhang .................. H04W 72/40

OTHER PUBLICATIONS

Huawei et al., "Sidelink resource allocation to reduce power con-
sumption," 3GPP TSG RAN WG1 Meeting #104bis-e, R1-2102323,
Apr. 2021, 20 pages.
InterDigital Inc., "Further Details on SL DRX Timers," 3GPP RAN
WG2 Meeting #113bis electronic, R2-2102802, Apr. 2021, 5 pages.
InterDigital, "Summary of [POST113-e][703][V2X/SL] Details of
Timer (InterDigital)," 3GPP TSG-RAN WG2 Meeting #113bis-e,
R2-2102801, Apr. 2021, 67 pages.
Huawei et al., "Consideration on the sidelink DRX for unicast,"
3GPP TSG-RAN WG2 Meeting #113bis-e, R2-2101762, Jan. 2021,
6 pages.
European Patent Office Application Serial No. 22788462.4, Search
Report dated Mar. 21, 2025, 10 pages.
LG Electronics, "Discussion on resource allocation for power
saving," 3GPP TSG RAN WG1 Meeting #104-e e-Meeting,
R1-2100517, Jan. 2021, 20 pages.

\* cited by examiner

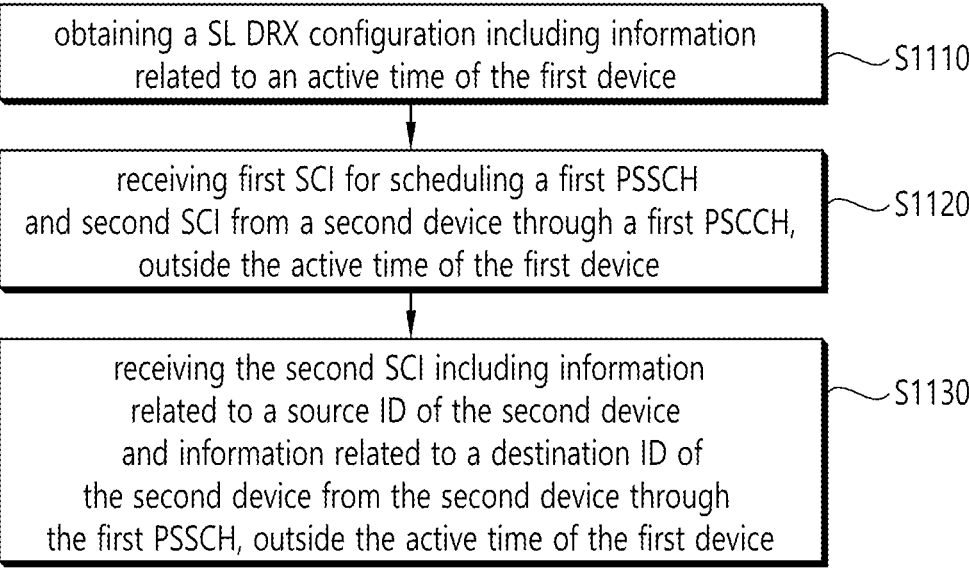

obtaining a SL DRX configuration including information related to an active time of the first device —— S1110 receiving first SCI for scheduling a first PSSCH and second SCI from a second device through a first PSCCH, outside the active time of the first device —— S1120 receiving the second SCI including information related to a source ID of the second device and information related to a destination ID of the second device from the second device through the first PSSCH, outside the active time of the first device —— S1130

FIG. 12

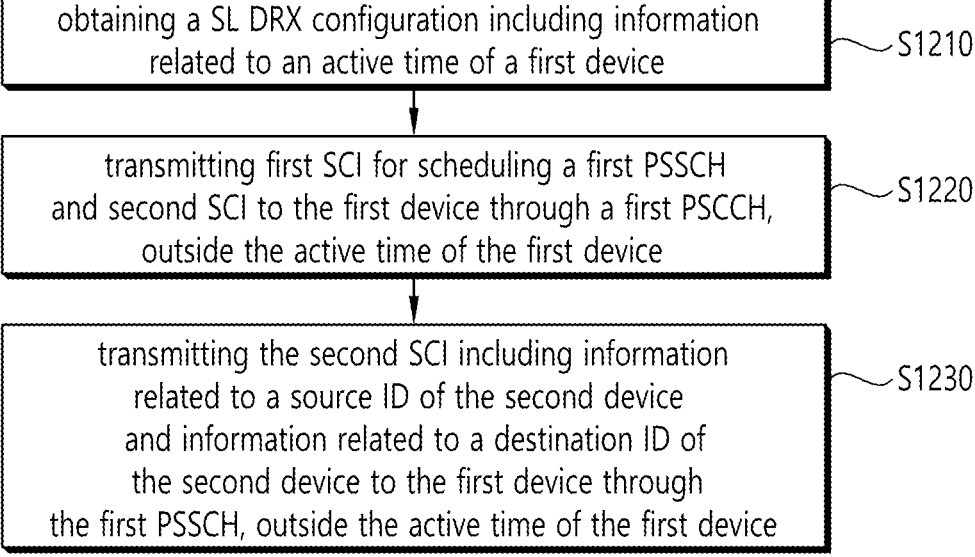

obtaining a SL DRX configuration including information related to an active time of a first device —— S1210 transmitting first SCI for scheduling a first PSSCH and second SCI to the first device through a first PSCCH, outside the active time of the first device —— S1220 transmitting the second SCI including information related to a source ID of the second device and information related to a destination ID of the second device to the first device through the first PSSCH, outside the active time of the first device —— S1230

Device (100,200)

FIG. 18

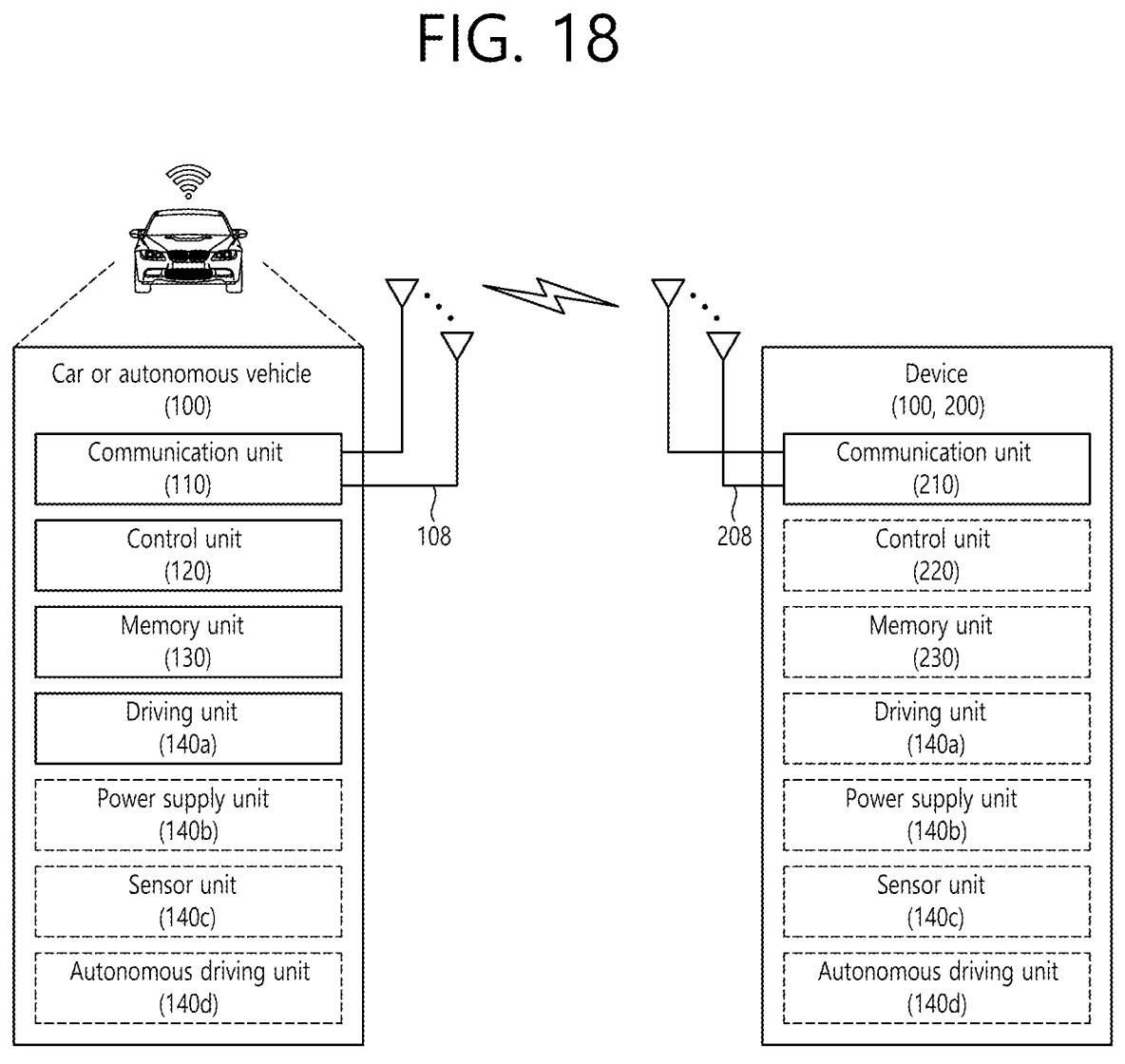

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

108

METHOD AND DEVICE FOR PERFORMING SL DRX OPERATION IN NR V2X

CROSS-REFERENCE TO RELATED APPLICATION(S)

This application is the National Stage filing under 35 U.S.C. 371 of International Application No. PCT/KR2022/005395, filed on Apr. 14, 2022, and also claims the benefit of U.S. Provisional Application No. 63/174,996, filed on Apr. 14, 2021, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, a power saving operation of a UE may be supported in NR V2X. For example, the UE may perform a sidelink (SL) DRX operation, based on an SL DRX configuration. In addition, when performing a sensing operation, the UE has conventionally performed the sensing operation, based on receiving of $1^{st}$ SCI. Therefore, when the UE performing the SL DRX operation has to perform the sensing operation based on receiving of $2^{nd}$ SCI, the DL DRX operation depending on any implementation of the UE may be performed. Accordingly, the UE's SL DRX operation based on the $2^{nd}$ SCI may be inefficient.

In an embodiment, a method in which a first device performs wireless communication is provided. The method may include: obtaining a sidelink (SL) discontinuous reception (DRX) configuration including information related to an active time of the first device; receiving first sidelink control information (SCI) for scheduling a first physical sidelink shared channel (PSSCH) and second SCI from a second device through a first physical sidelink control channel (PSCCH), outside the active time of the first device; and receiving the second SCI including information related to a source identity (ID) of the second device and information related to a destination ID of the second device from the second device through the first PSSCH, outside the active time of the first device. Herein, an SL DRX timer may not be started by the first device, based on that the source ID of the second device matches a destination ID of the first device and the destination ID of the second device matches a source ID of the first device.

In an embodiment, a first device performing wireless communication is provided. The first device may include: one or more memories storing instructions; one or more transceivers; and one or more processors coupling the one or more memories and the one or more transceivers. The one or more processors may execute the instructions to:

obtain an SL DRX configuration including information related to an active time of the first device; receive first SCI for scheduling a first PSSCH and second SCI from a second device through a first PSCCH, outside the active time of the first device; and receive the second SCI including information related to a source ID of the second device and information related to a destination ID of the second device from the second device through the first PSSCH, outside the active time of the first device. Herein, an SL DRX timer may not be started by the first device, based on that the source ID of the second device matches a destination ID of the first device and the destination ID of the second device matches a source ID of the first device.

An apparatus configured to control a first UE is provided. The apparatus may include:

one or more memories operatively coupled by the one or more processors and storing instructions. The one or more processors may execute the instructions to: obtain an SL DRX configuration including information related to an active time of the first UE; receive first SCI for scheduling a first PSSCH and second SCI from a second UE through a first PSCCH, outside the active time of the first UE; and receive the second SCI including information related to a source ID of the second UE and information related to a destination ID of the second UE from the second device through the first PSSCH, outside the active time of the first UE. Herein, an SL DRX timer may not be started by the first UE, based on that the source ID of the second UE matches a destination ID of the first UE and the destination ID of the second UE matches a source ID of the first UE.

A non-transitory computer-readable medium having instructions recorded thereon is proposed. The instruction, when executed by one or more processors, may cause the one or more processors to obtain an SL DRX configuration including information related to an active time of the first device, receive first SCI for scheduling a first PSSCH and second SCI from a second device through a first PSCCH, outside the active time of the first device, and receive the second SCI including information related to a source ID of the second device and information related to a destination ID of the second device from the second device through the first PSSCH, outside the active time of the first device. Herein, an SL DRX timer may not be started by the first device, based on that the source ID of the second device matches a destination ID of the first device and the destination ID of the second device matches a source ID of the first device.

A method in which a second device performs wireless communication is proposed. The method may include: obtaining an SL DRX configuration including information related to an active time of a first device; transmitting first SCI for scheduling a first PSSCH and second SCI to the first device through a first PSCCH, outside the active time of the first device; and transmitting the second SCI including information related to a source ID of the second device and information related to a destination ID of the second device to the first device through the first PSSCH, outside the active time of the first device. Herein, an SL DRX timer may not be started by the first device, based on that the source ID of the second device matches a destination ID of the first device and the destination ID of the second device matches a source ID of the first device.

A second device performing wireless communication is provided. The second device may include: one or more memories storing instructions; one or more transceivers; and one or more processors coupling the one or more memories and the one or more transceivers. The one or more processors may execute the instructions to obtain an SL DRX configuration including information related to an active time of a first device, transmit first SCI for scheduling a first PSSCH and second SCI to the first device through a first PSCCH, outside the active time of the first device, and transmit the second SCI including information related to a source ID of the second device and information related to a destination ID of the second device to the first device through the first PSSCH, outside the active time of the first device. Herein, an SL DRX timer may not be started by the first device, based on that the source ID of the second device matches a destination ID of the first device and the destination ID of the second device matches a source ID of the first device.

A UE can efficiently perform sidelink communication.

BRIEF DESCRIPTION OF THE DRAWINGS

FIG. 2 shows a radio protocol architecture, based on an embodiment of the present disclosure.

FIG. 11 shows a method for a first device to perform wireless communication, according to an embodiment of the present disclosure.

FIG. 12 shows a method for a second device to perform wireless communication according to an embodiment of the present disclosure.

FIG. 18 shows a vehicle or an autonomous vehicle, based on an embodiment of the present disclosure.

DETAILED DESCRIPTION

Figure 1:
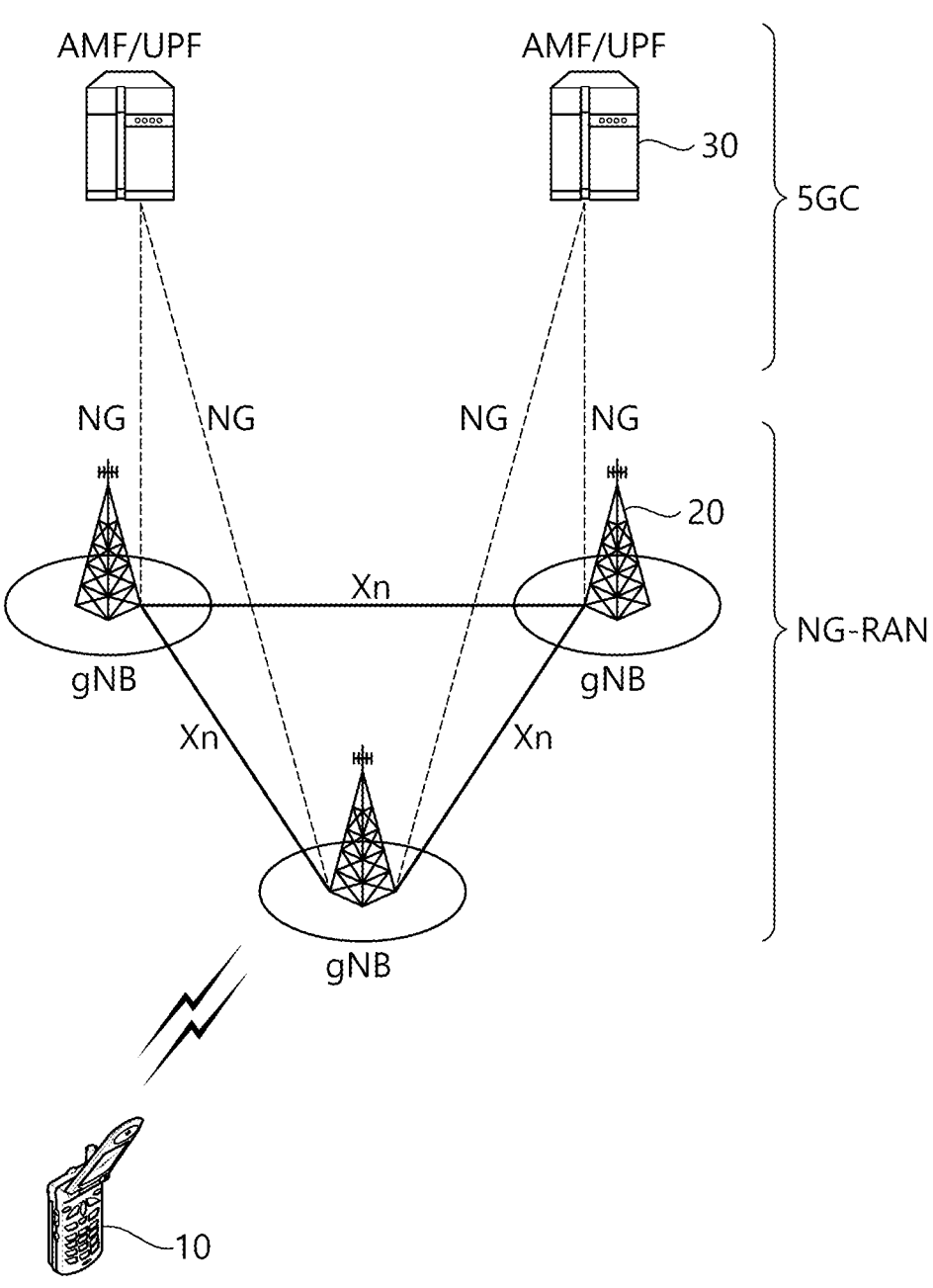
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
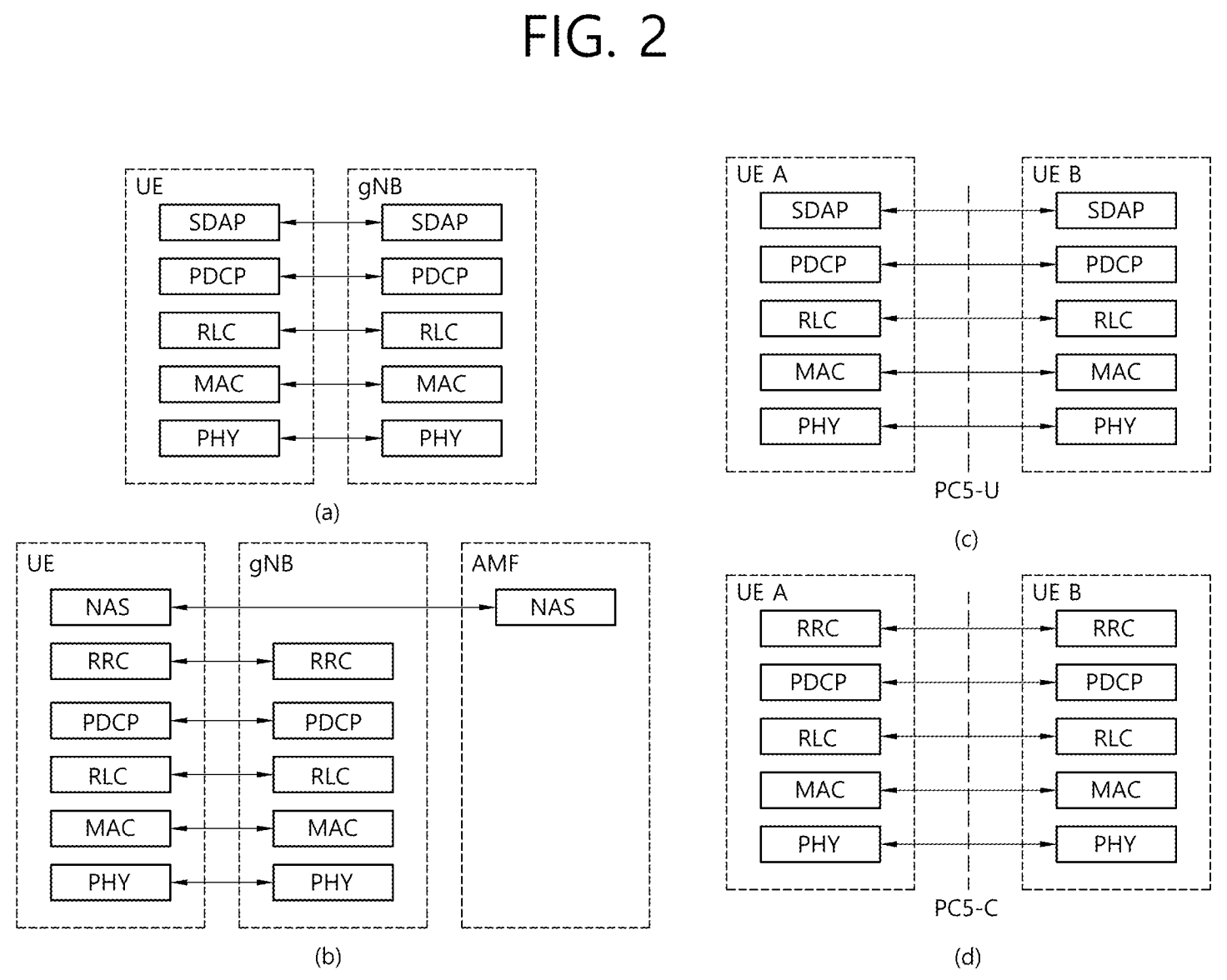

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
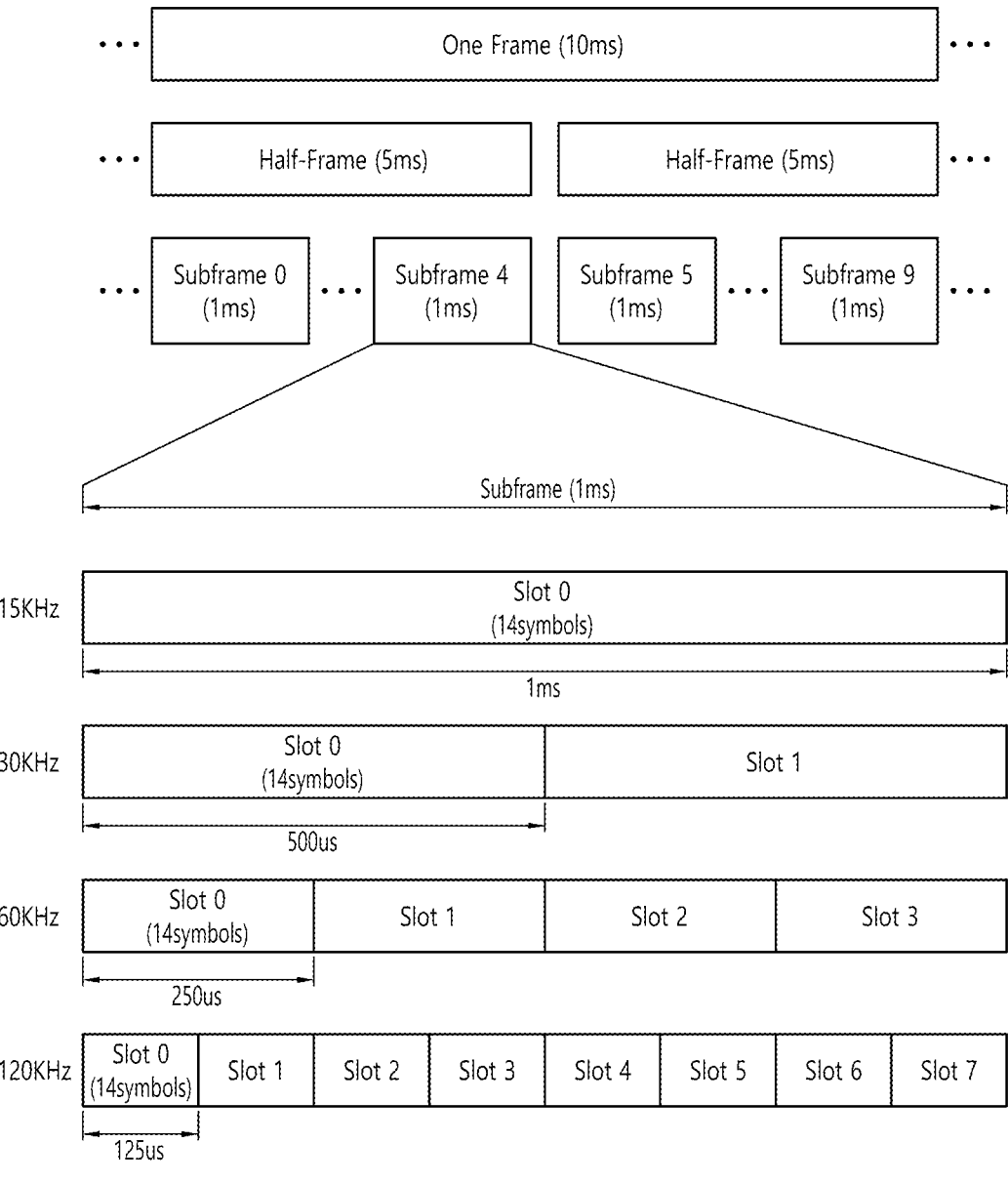
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
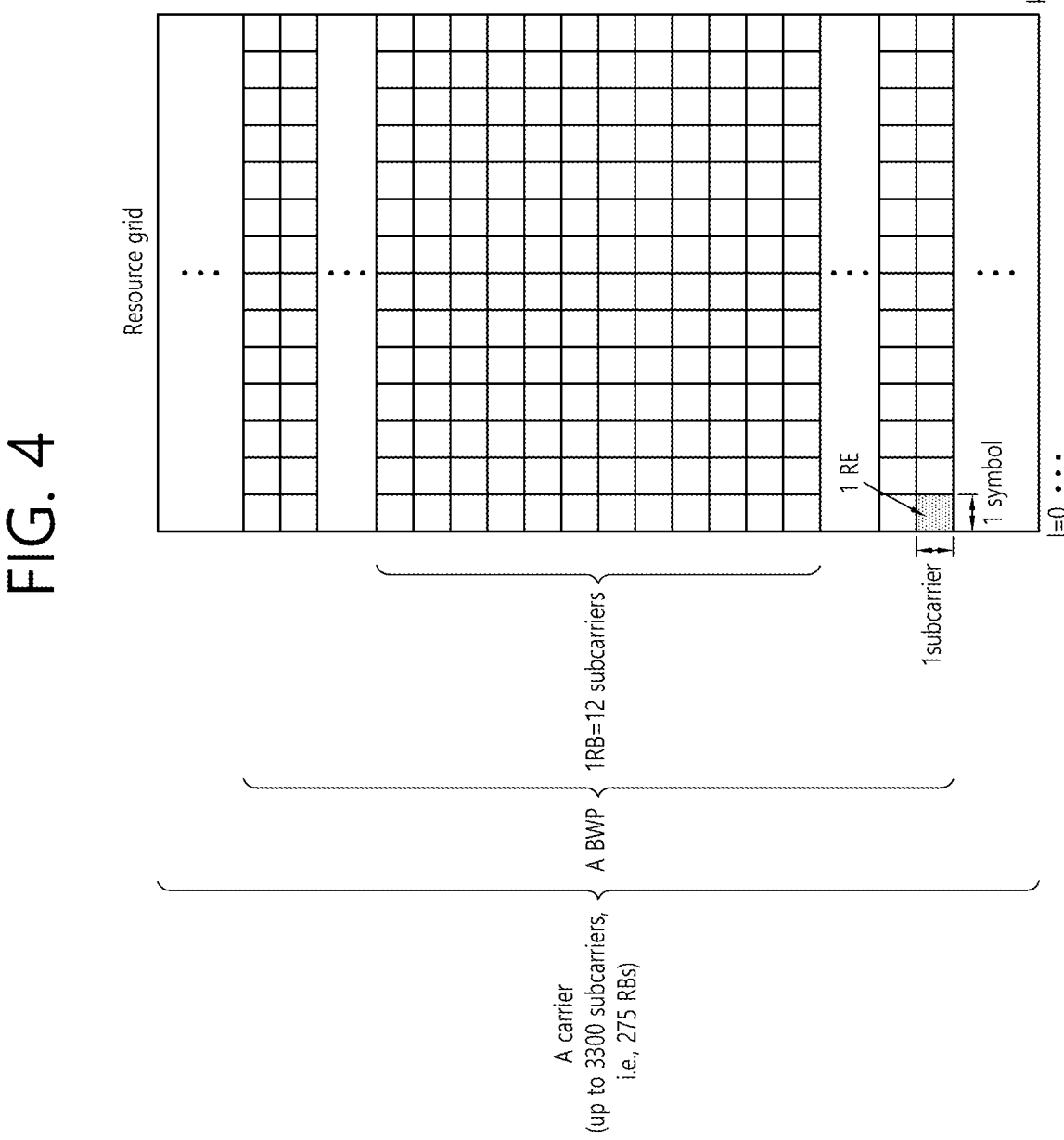
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
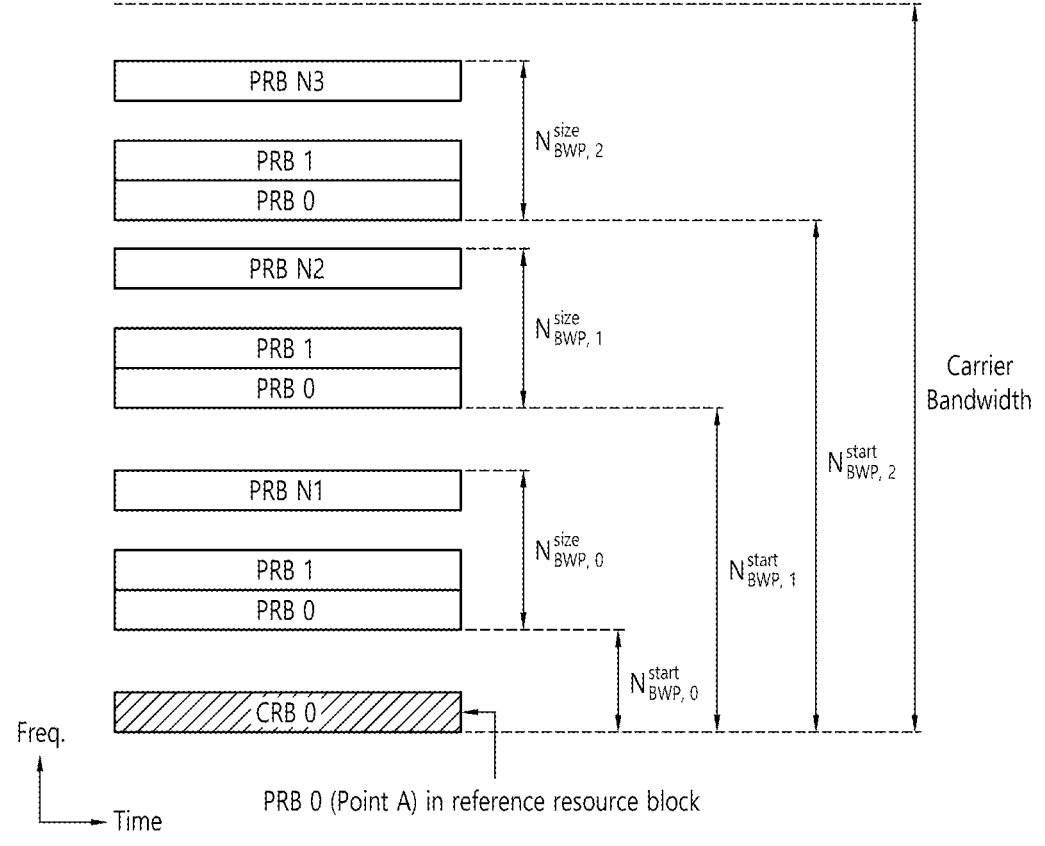
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
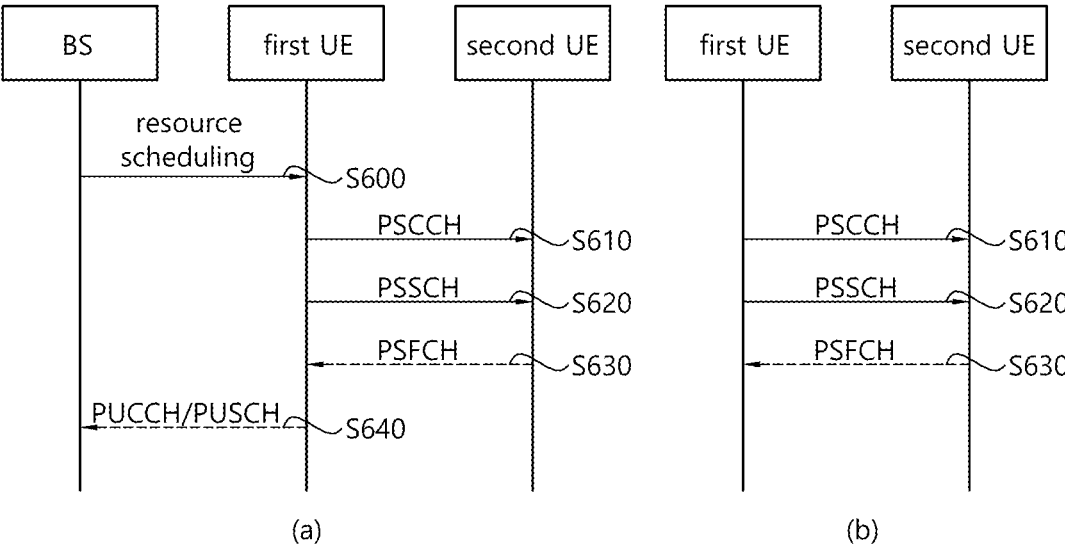
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2(N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

14

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
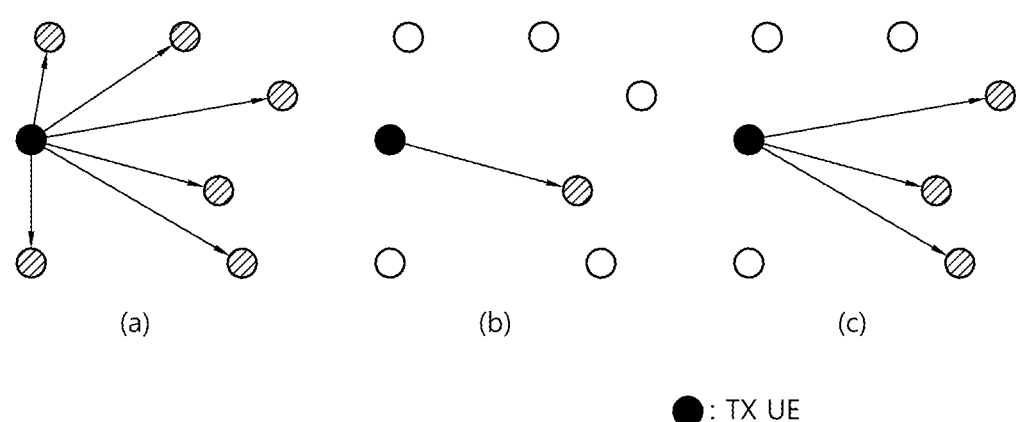
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 8:
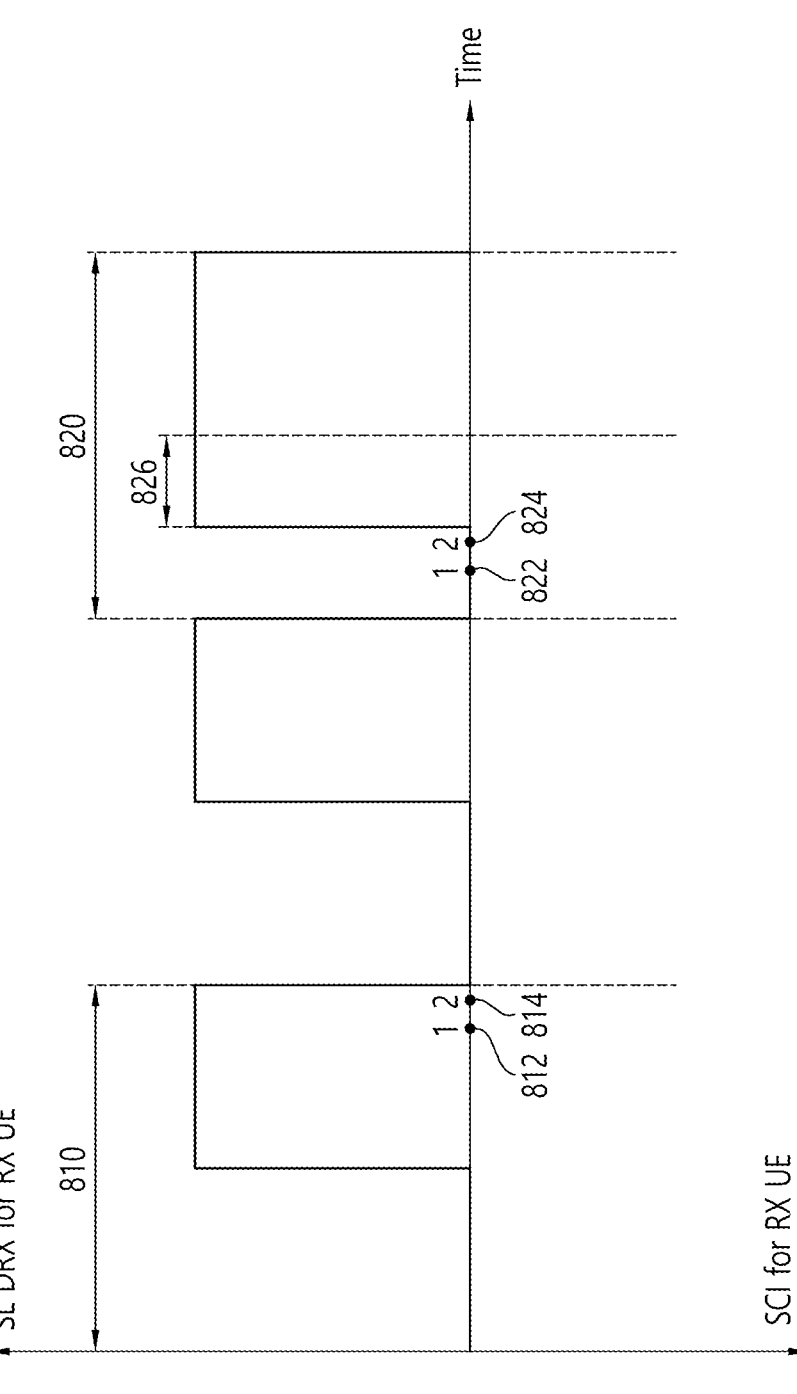
FIG. 8 is a drawing for explaining a problem of a method in which a UE performs a DRX operation, based on 2nd-stage SCI, according to an embodiment of the present disclosure.

FIG. 8 is a drawing for explaining a problem of a method in which a UE performs a DRX operation, based on 2nd-stage SCI, according to an embodiment of the present disclosure.

Referring to FIG. 8, a TX UE may transmit 1st-stage SCI to an RX UE through a PSCCH. In addition, for example, the RX UE may perform a sensing operation, based on receiving of the 1st-stage SCI, when performing the sensing operation. In addition, for example, the RX UE may monitor the 1st-stage SCI to perform the sensing operation. However, the TX UE may transmit 2nd-stage SCI to the RX UE through the PSCCH and/or a PSSCH. Therefore, for example, the RX UE may monitor receiving of the 1st-stage SCI and the 2nd-stage SCI when performing the sensing operation. Therefore, the RX UE may perform the sensing operation, based on receiving of the 1st-stage SCI and/or the 2nd-stage SCI. Meanwhile, the RX UE may perform SL DRX, based on an SL DRX configuration. Therefore, for example, the RX UE may monitor and/or receive 1st-stage SCI 812 and 2nd-stage SCI 814 within an SL DRX active time of a first DRX cycle 810 of the RX UE.

However, for example, when the RX UE receives the 2nd-stage SCI 814 for sensing in the process of receiving the 1st-stage SCI 812 for sensing within the SL DRX active time, the RX UE may not initiate an SL DRX timer to receive a new packet. In addition, for example, the new packet may be a packet for the RX UE. For example, a source ID of a TX UE which has transmitted the new packet may match a destination ID of an RX UE of which a unicast connection is established to the TX UE, and a destination ID of the TX UE may match a source ID of the RX UE. In addition, for example, the new packet may be a packet in which large-volume data is transmitted in a divided manner or a packet in which small-volume data is persistently transmitted. Therefore, the new packet and/or subsequent packets may be wasted within the SL DRX active time of the RX UE.

Meanwhile, referring to FIG. 8, the RX UE may wake-up temporarily for a sensing operation and/or data transmission/ reception operation within an SL DRX inactive time (outside the SL DRX active time) of the RX UE. For example, the RX UE may monitor and/or receive 1st-stage SCI 822 within an SL DRX inactive time of a second DRX cycle 820 for a data transmission/reception operation. In addition, for example, the RX UE may monitor and/or receive 2nd-stage SCI 824 within the SL DRX inactive time of the second DRX cycle 820 for the sensing operation.

However, for example, the RX UE may receive the 2nd-stage SCI 824 for sensing in the process of receiving the 1st-stage SCI 822 for data transmission/reception within the SL DRX inactive time. In addition, for example, the RX UE may initiate an SL DRX timer 826 after receiving the 1st-stage SCI and the 2nd-stage SCI to receive a new packet.

However, for example, the new packet may be a packet for the RX UE. For example, a source ID (e.g., a layer 1 (L1) source ID) of a TX UE which has transmitted the new packet may match a destination ID (e.g., a partial bit of an L2 destination ID) of an RX UE of which a unicast connection is established to the TX UE, and a destination ID (e.g., an L1 destination ID) of the TX UE may match a source ID (e.g., a partial bit of the source ID) of the RX UE. For example, a destination ID (e.g., a groupcast L1 destination ID, a broadcast L1 destination ID, or the like) included in the $2^{nd}$-stage SCI transmitted by the TX UE may match a destination ID (e.g., a groupcast L1 destination ID, a broadcast L1 destination ID, or the like) of the RX UE. For example, the new packet may be a packet in which large-volume data is transmitted in a divided manner or a packet in which small-volume data is persistently transmitted. Therefore, the SL DRX timer may persistently run even within an SL DRX inactive time. For example, an SL DRX inactivity timer, an SL DRX round-trip timer (RTT), and/or an SL DRX retransmission timer may persistently run even within the SL DRX inactive time. Accordingly, the RX UE cannot save power even within the SL DRX inactive time. Therefore, a method of perform the SL DRX operation and an apparatus supporting the method are proposed to solve the aforementioned problem, according to various embodiments of the present disclosure.

An SL DRX configuration referred to in this disclosure may include at least one or more of the following parameters.

For example, an SL DRX configuration may include one or more of the information listed below.

(!) For example, SL drx-onDurationTimer may be information on the duration at the beginning of a DRX Cycle. For example, a start period of a DRX cycle may be information on a period in which a terminal operates in an active mode to transmit or receive sidelink data.

(2) For example, SL drx-SlotOffset may be information on a delay before starting a drx-onDurationTimer of a DRX-on duration timer.

(3) For example, SL drx-InactivityTimer may be information on the duration after the PSCCH occasion in which a PSCCH indicates a new sidelink transmission and reception for the MAC entity. For example, when a transmitting terminal instructs PSSCH transmission through a PSCCH, the transmitting terminal operates in an active mode while an SL drx-InactivityTimer is running, so that the transmitting terminal may transmit PSSCH to a receiving terminal. Also, for example, when a receiving terminal is instructed that a transmitting terminal transmits a PSSCH through PSCCH reception, the receiving terminal operates in an active mode while SL drx-InactivityTimer is running, so that the receiving terminal may receive the PSSCH from the transmitting terminal.

(4) For example, SL drx-RetransmissionTimer may be information on the maximum duration until a retransmission is received. For example, SL drx-RetransmissionTimer may be configured per HARQ process.

(5) For example, SL drx-HARQ-RTT-Timer may be information on the minimum duration before an assignment for HARQ retransmission is expected by the MAC entity. For example, SL drx-HARQ-RTT-Timer may be configured per HARQ process.

(6) For example, SL drx-LongCycleStartOffset may be information on the Long DRX cycle and drx-StartOffset which defines the subframe where the Long and Short DRX Cycle starts.

(7) For example, SL drx-ShortCycle may be information on the Short DRX cycle. For example, SL drx-ShortCycle may be optional information.

(8) For example, SL drx-ShortCycleTimer may be information on the duration a UE shall follow the Short DRX cycle. For example, SL drx-ShortCycleTimer may be optional information.

The following SL DRX timer mentioned in this disclosure may be used for the following purposes.

(1) SL DRX on-duration timer: A period in which a UE performing an SL DRX operation should basically operate in an active time to receive a counterpart UE's PSCCH/ PSSCH.

(2) SL DRX inactivity timer: A period in which a UE performing an SL DRX operation extends an SL DRX on-duration period, which is a period in which an active time is basically required to receive PSCCH/PSSCH of a counterpart UE.

For example, a UE may extend an SL DRX on-duration timer by an SL DRX inactivity timer period. Also, when a UE receives a new packet (e.g., new PSSCH transmission) from a counterpart UE, the UE may start an SL DRX inactivity timer to extend the SL DRX on-duration timer.

For example, an SL DRX inactivity timer may be used to extend an SL DRX duration timer period, which is a period in which an RX UE performing an SL DRX operation should basically operate as an active time to receive a PSCCH/PSSCH of the other TX UE. That is, an SL DRX on-duration timer may be extended by an SL DRX inactivity timer period. In addition, when an RX UE receives a new packet (e.g., new PSSCH transmission) from a counterpart TX UE, the RX UE may start an SL DRX inactivity timer to extend the SL DRX on-duration timer.

(3) SL DRX HARQ RTT timer: A period in which a UE performing an SL DRX operation operates in a sleep mode until it receives a retransmission packet (or PSSCH assignment) transmitted by a counterpart UE.

For example, when a UE starts an SL DRX HARQ RTT timer, the UE may determine that a counterpart UE will not transmit a sidelink retransmission packet to it until the SL DRX HARQ RTT timer expires, and may operate in a sleep mode while the corresponding timer is running. For example, when a UE starts an SL DRX HARQ RTT timer, the UE may not monitor sidelink retransmission packets from a counterpart UE until the SL DRX HARQ RTT timer expires. For example, when an RX UE that has received a PSCCH/PSSCH transmitted by a TX UE transmits SL HARQ NACK feedback, the RX UE may start an SL DRX HARQ RTT timer. In this case, an RX UE may determine that a counterpart TX UE will not transmit a sidelink retransmission packet to it until an SL DRX HARQ RTT timer expires, and the RX UE may operate in a sleep mode while the corresponding timer is running.

(4) SL DRX retransmission timer: A timer that starts when an SL DRX HARQ RTT timer expires, and a period in which a UE performing SL DRX operation operates as an active time to receive a retransmission packet (or PSSCH assignment) transmitted by a counterpart UE.

For example, during the corresponding timer period, a UE may receive or monitor a retransmission sidelink packet (or PSSCH assignment) transmitted by a counterpart UE. For example, an RX UE may receive or monitor a retransmission sidelink packet (or PSSCH assignment) transmitted by a counterpart TX UE while an SL DRX retransmission timer is running.

The following Uu DRX timer mentioned in this disclosure may be used for the following purposes.

(1) Uu DRX HARQ RTT TimerSL

For example, Uu DRX HARQ RTT TimerSL may be used in a period in which a UE performing Uu DRX operation does not need to monitor DCI (PDCCH) for SL Mode 1 operation transmitted by a base station. That is, while a Uu DRX HARQ RTT TimerSL is running, a UE may not need to monitor a PDCCH for an SL Mode 1 operation.

(2) Uu DRX Retransmission TimerSL

For example, it may be used in a period in which a UE performing Uu DRX operation monitors DCI (PDCCH) for SL Mode 1 operation transmitted by a base station. That is, while a Uu DRX Retransmission TimerSL is running, a UE may monitor a PDCCH transmitted by a base station for an SL Mode 1 operation.

In the present disclosure, names of timers (Sidelink DRX Onduration Timer, Sidelink DRX Inactivity Timer, Sidelink DRX HARQ RTT Timer, Sidelink DRX Retransmission Timer, Uu DRX HARQ RTT TimerSL, Uu DRX Retransmission TimerSL, etc.) are exemplary, and timers that perform the same/similar functions based on content described in each timer may be regarded as the same/similar timers regardless of their names.

Figure 9:
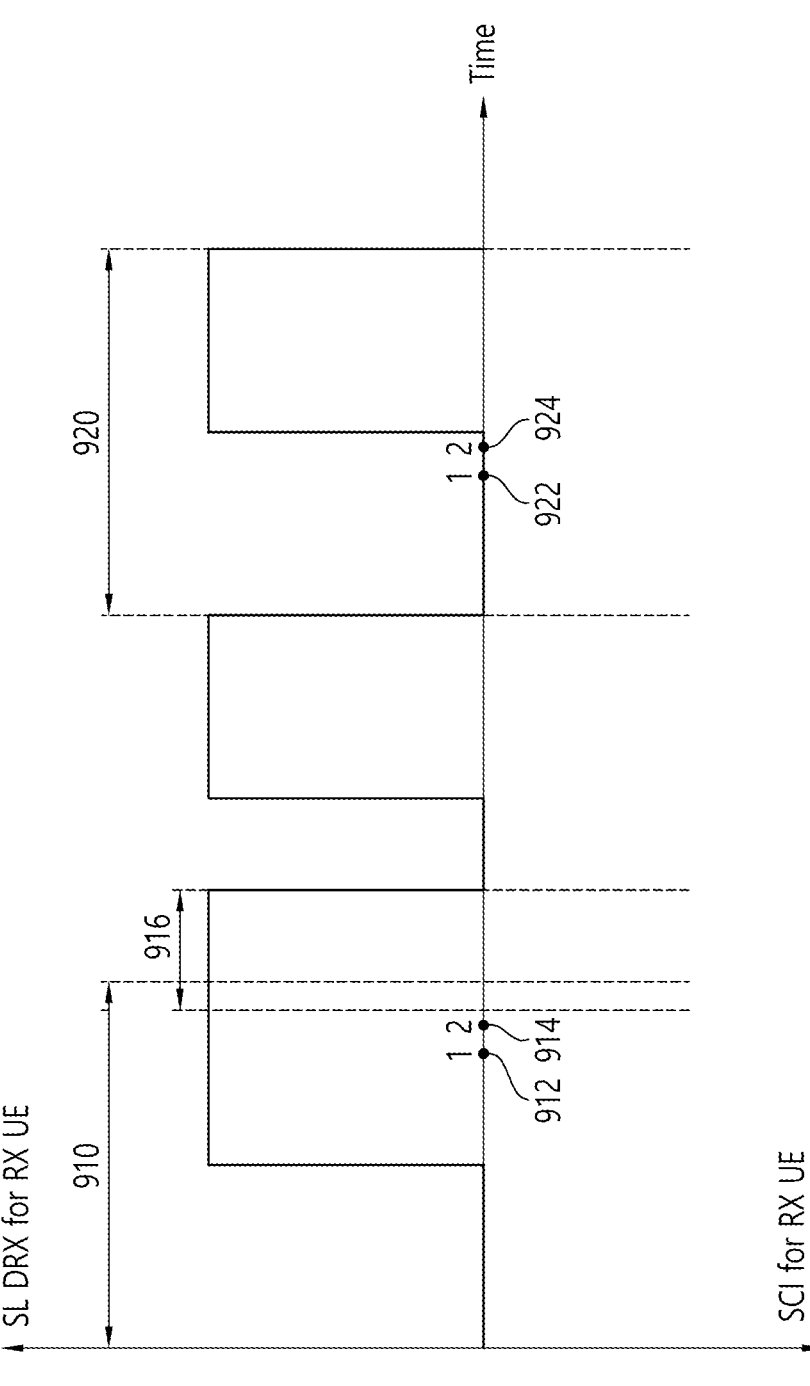
FIG. 9 shows a method in which a UE performs a DRX operation, based on 2nd-stage SCI, according to an embodiment of the present disclosure.

Hereinafter, FIG. 9 is a drawing for explaining a method of performing a DRX operation, based on 2nd-stage SCI, according to an embodiment of the present disclosure. The embodiment of FIG. 9 may be combined with various embodiments of the present disclosure.

Referring to FIG. 9, an RX UE may establish a unicast connection with a TX UE. For example, the TX UE may transmit 1st-stage SCI to the RX UE through a PSCCH. For example, the 1st-stage SCI may be information for scheduling of a PSSCH and $2^{nd}$-stage sidelink control information (SCI). In addition, for example, the TX UE may transmit the 2nd-stage SCI to the RX UE through the PSCCH and/or the PSSCH. In addition, for example, the RX UE may monitor the 1st-stage SCI and the $2^{nd}$-stage SCI or receiving of the 2nd-stage SCI, when performing a sensing operation. For example, the RX UE may perform the sensing operation, based on the receiving of the 1st-stage SCI and/or the 2nd-stage SCI. Meanwhile, the RX UE may perform SL DRX, based on an SL DRX configuration. For example, the RX UE may monitor and/or receive 1st-stage SCI 922 within an SL DRX inactive time of a second DRX cycle 920. In addition, for example, the RX UE may monitor and/or receive 2nd-stage SCI 924 within the SL DRX inactive time of the second DRX cycle 920 for the sensing operation. For example, the 2nd-stage SCI may include information related to a source identity (ID) of the TX UE and a destination ID of the TX UE.

However, for example, the RX UE may receive the 2nd-stage SCI 924 in the process of receiving the 1st-stage SCI 922 for sensing within the SL DRX inactive time of the second DRX cycle 920. In addition, for example, the RX UE may determine whether a layer1 (L1) and/or layer2 (L2) source ID of the TX UE matches an L1 and/or L2 destination ID of the RX UE. For example, the RX UE may determine whether an L1 and/or L2 destination ID of the TX UE matches an L1 and/or L2 source ID of the TX UE. For example, for a receiving/monitoring operation for sensing, the RX UE may not initiate an SL DRX timer, when the L1 and/or L2 source ID of the TX UE matches the L1 and/or L2 destination ID of the RX UE and the L1 and/or L2 destination ID of the RX UE matches the L1 and/or L2 source ID of the TX UE. Therefore, the RX UE may save power within an SL DRX inactive time.

On the contrary, referring to FIG. 9, the RX UE may monitor and/or receive 1st-stage SCI 912 and/or 2nd-stage SCI 914 within an SL DRX active time of a first DRX cycle 910 of the RX UE. For example, the RX UE may receive the 2nd-stage SCI 914 for sensing in the process of receiving the 1st-stage SCI 912 for data transmission/reception within the SL DRX active time. The 2nd-stage SCI may include information related to a source ID of the TX UE and a destination ID of the TX UE. In addition, for example, the RX UE may determine whether an L1 and/or L2 source ID of the TX UE matches an L1 and/or L2 destination ID of the RX UE. For example, the RX UE may determine whether an L1 and/or L2 destination ID of the TX UE matches an L1 and/or L2 source ID of the TX UE. For example, for a receiving/monitoring operation for data transmission/reception, the RX UE may initiate an SL DRX timer, when the L1 and/or L2 source ID of the TX UE matches the L1 and/or L2 destination ID of the RX UE and the L1 and/or L2 destination ID of the RX UE matches the L1 and/or L2 source ID of the TX UE. For example, the RX UE may initiate an SL DRX timer 916 to receive a new packet. For example, the RX UE may initiate an SL DRX inactivity timer, an SL DRX round-trip timer (RTT), and/or an SL DRX retransmission timer within the SL DRX inactive time. For example, a packet included in the 2nd-stage SCI may be a packet in which large-volume data is transmitted in a divided manner or a packet in which small-volume data is persistently transmitted. Therefore, the new packet and/or subsequent packets may not be wasted.

Meanwhile, unlike in FIG. 9, for example, a destination ID (e.g., a groupcast L1 destination ID, a broadcast L1 destination ID, or the like) included in the 2nd-stage SCI transmitted by the TX UE within the active time of the RX UE may match a destination ID (e.g., a groupcast L1 ID, a broadcast L1 destination ID, or the like) of the RX UE (e.g., whether it matches or not may be determined by the RX UE). In addition, in this case, for example, the RX UE may initiate the SL DRX timer. In addition, unlike in FIG. 9, for example, the destination ID (e.g., the groupcast L1 destination ID, the broadcast L1 destination ID, or the like) transmitted by the TX UE outside the active time of the RX UE may match the destination ID (e.g., the groupcast L1 destination ID, the broadcast L1 destination ID, or the like) of the RX UE. In addition, in this case, for example, the RX UE may not initiate the SL DRX timer.

Therefore, according to an embodiment of the present disclosure, it is possible to solve a problem occurring when the RX UE randomly implements the SL DRX operation of the RX UE in a case where the RX UE performs the sensing operation based on the $2^{nd}$ SCI. In addition, according to an embodiment of the present disclosure, the TX UE may efficiently perform SL communication within the SL DRX active time of the RX UE. In addition, according to an embodiment of the present disclosure, the RX UE may efficiently perform the sensing operation, based on the SL DRX configuration. In addition, according to an embodiment of the present disclosure, the RX UE may efficiently select a resource, based on the SL DRX configuration. In addition, according to an embodiment of the present disclosure, it may be preemptively blocked that the RX UE unnecessarily runs the SL DRX timer. In addition, according to an embodiment of the present disclosure, unnecessary monitoring of the RX UE for the transmission of the TX UE may be decreased. In addition, according to an embodiment of the present disclosure, the RX UE may efficiently save power, based on the SL DRX configuration.

Figure 10:
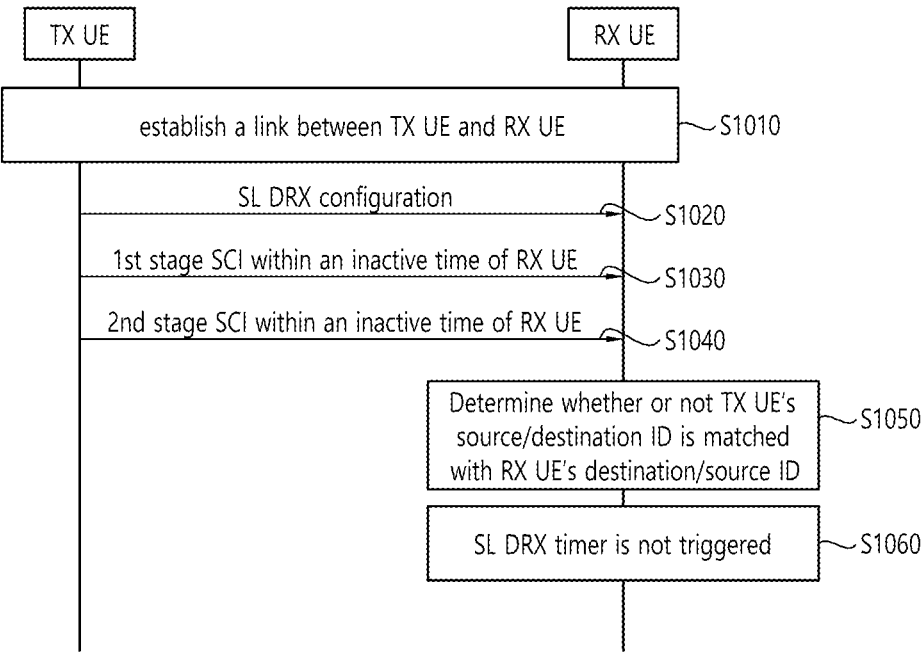
FIG. 10 shows a procedure in which a UE performs a DRX operation, according to an embodiment of the present disclosure.

Hereinafter, FIG. 10 shows a procedure in which a UE performs a DRX operation, according to an embodiment of the present disclosure. The embodiment of FIG. 10 may be combined with various embodiments of the present disclosure.

Referring to FIG. 10, a TX UE may transmit a direct communication request message for establishing a link to an RX UE. For example, the link may be a unicast link. For example, the direct communication request message may include an identifier of the RX UE and information related to at least one service requested by the TX UE. For example, the TX UE may receive a direct communication accept message from the RX UE. For example, the direct communication accept message may include the identifier of the RX UE and security information regarding establishment of security between the TX UE and the RX UE. In addition, for example, the TX UE may establish the link between the TX UE and the RX UE (S1010).

In addition, for example, the TX UE may transmit an SL DRX configuration including an active time of the RX UE to the RX UE (S1020). For example, the TX UE may transmit an SL DRX configuration including the active time of the RX UE to the RX UE, based on a radio resource control (RRC) link. In addition, for example, the TX UE may transmit first SCI to the RX UE, outside the active time of the RX UE (S1030). For example, the first SCI may be information for scheduling a PSSCH and second SCI through a PSCCH. For example, the TX UE may transmit the second SCI to the RX UE through the PSSCH, outside the active time of the RX UE (S1040). For example, the second SCI may include information related to a source ID of the TX UE and/or information related to a destination ID of the second device.

In addition, for example, the RX UE may determine whether the source ID of the TX UE matches the destination ID of the RX UE and/or the destination ID of the TX UE matches the source ID of the TX UE (S1050). For example, it may be determined whether a destination ID (e.g., a groupcast L1 destination ID, a broadcast L1 destination ID, or the like) included in the 2nd-stage SCI matches a destination ID (e.g., a groupcast L1 destination ID, a broadcast L1 destination ID, or the like) of the RX UE.

For example, the RX UE may not initiate an SL DRX timer, based on that the source ID of the TX UE matches the destination ID of the RX UE and/or the destination ID of the TX UE matches the source ID of the TX UE (S1060). For example, when a destination ID (e.g., a groupcast L1 destination ID, a broadcast L1 destination ID, or the like) included in the 2nd-stage SCI transmitted by the TX UE outside the active time of the RX UE matches a destination ID (e.g., a groupcast L1 destination ID, a broadcast L1 destination ID, or the like) of the RX UE, the RX UE may not initiate the SL DRX timer. For example, the RX UE may be configured by the TX UE so that the SL DRX timer is not started, based on the decision(s) on whether the IDs match. For example, the TX UE may transmit second SCI including information preventing the SL DRX timer of the RX UE from not being initialized based on the decision(s) on whether the IDs match.

According to an embodiment of the present disclosure, for example, in a case where a P-UE (e.g., a power saving UE) receives the $2^{nd}$ SCI within an SL DRX active time duration (e.g., an awake duration for receiving a signal and/or data of a counterpart UE of the P-UE, an SL DRX on-duration timer, an SL DRX inactivity timer, or a time for which an SL DRX retransmission timer is running) in sidelink unicast communication, the P-UE may start (e.g., restart) the SL DRX timer (e.g., an SL DRX inactivity timer or an SL DRX hybrid automatic repeat request (HARQ) round-trip-time (RTT) timer/SL DRX HARQ retransmission timer).

When the L1 source ID included in the $2^{nd}$ SCI transmitted by the TX UE matches a partial bit of an L2 destination ID of the RX UE (e.g., the UE which has received the $2^{nd}$ SCI) while the L1 destination ID included in the $2^{nd}$ SCI transmitted by the TX UE matches a partial bit of the L2 source ID of the RX UE (e.g., the UE which has received the $2^{nd}$ SCI)

For example, the RX UE may be the P-UE (e.g., the power saving UE).

According to an embodiment of the present disclosure, for example, the P-UE may receive the $2^{nd}$ SCI for the purpose of sensing as well as monitoring the $2^{nd}$ SCI for data reception. In addition, for example, the P-UE may not perform the operation of monitoring SCI (e.g., $1^{st}$ SCI, $2^{nd}$ SCI) for data reception within the SL DRX inactive time. In addition, for example, the P-UE may not perform the operation of monitoring the SCI (e.g., $1^{st}$ SCI, $2^{nd}$ SCI) for data reception within the SL DRX inactive time but may perform the sensing even in the SL DRX inactive time duration. For example, the P-UE (e.g., the power saving UE, a pedestrian UE) or a V-UE (e.g., a vehicle UE) may perform the operation of monitoring the SCI (e.g., $1^{st}$ SCI, $2^{nd}$ SCI) for sensing even in the SL DRX inactive time duration.

According to an embodiment of the present disclosure, for example, in a case where the P-UE (e.g., the power saving UE) receives the $2^{nd}$ SCI within an SL DRX inactive time duration (e.g., a duration in which a sidelink signal for data reception of a counterpart UE of the P-UE is not necessarily to be monitored) in sidelink unicast communication, if the following case is satisfied, the P-UE may not (re)start the SL DRX timer (e.g., an SL DRX inactivity timer or an SL DRX hybrid automatic repeat request (HARQ) round-trip-time (RTT) timer/SL DRX HARQ retransmission timer). For example, in a case where the P-UE (e.g., the power saving UE) receives the $2^{nd}$ SCI within an SL DRX inactive time duration (e.g., a duration in which a sidelink signal for data reception of a counterpart UE of the P-UE is not necessarily to be monitored) in sidelink unicast communication, if the following case is satisfied, the P-UE may not (re)start the SL DRX timer (e.g., an SL DRX inactivity timer or an SL DRX HARQ RTT timer/SL DRX HARQ retransmission timer), the P-UE may receive data (e.g., packet data), based on the $2^{nd}$ SCI, and/or after completion of the reception operation, and/or the P-UE may transmit the data to a higher layer (e.g., in case of a physical layer, a MAC layer, RLC layer, PDCP layer, and/or SDAP layer or the like which are higher layers of the physical layer).

Even if the L1 source ID included in the $2^{nd}$ SCI transmitted by the TX UE matches a partial bit of an L2 destination ID of the RX UE (e.g., the UE which has received the $2^{nd}$ SCI) while the L1 destination ID included in the $2^{nd}$ SCI transmitted by the TX UE matches a partial bit of the L2 source ID of the RX UE (e.g., the UE which has received the $2^{nd}$ SCI), the P-UE may regard reception of the $2^{nd}$ SCI as not the operation for data reception but the operation for sensing, and the P-UE may not start the SL DRX timer (e.g., the SL DRX inactivity timer or the SL DRX HARQ RTT timer/SL DRX HARQ retransmission timer).

Even if the P-UE has received SCI (e.g., $1^{st}$ SCI, $2^{nd}$ SCI) transmitted by the TX UE, the P-UE may regard reception of the SCI as not an operation for data reception but an operation for sensing, and the P-UE may not start the SL DRX timer (e.g., the SL DRX inactivity timer or the SL DRX HARQ RTT timer/SL DRX HARQ retransmission timer). For example, even if the P-UE has received the SCI (e.g., $1^{st}$ SCI, $2^{nd}$ SCI) transmitted by the TX UE, irrespective of whether the L1 source/destination ID matches/mismatches an ID of the P-UE (e.g., the UE which has received the SCI), the P-UE may regard reception of the SCI as not the operation for data reception but the operation for sensing, and the P-UE may not start the SL DRX timer (e.g., the SL DRX inactivity timer or the SL DRX HARQ RTT timer/SL DRX HARQ retransmission timer).

According to an embodiment of the present disclosure, for example, in a case where the P-UE (e.g., the power saving UE) receives the $2^{nd}$ SCI within an SL DRX active time duration (e.g., an awake duration for receiving a signal and/or data of a counterpart UE of the P-UE, an SL DRX on-duration timer, an SL DRX inactivity timer, or a time for which an SL DRX retransmission timer is running) in sidelink groupcast communication/sidelink broadcast communication, if the following case is satisfied, the P-UE may start (e.g., restart) the SL DRX timer (e.g., an SL DRX inactivity timer or an SL DRX HARQ RTT timer/SL DRX HARQ retransmission timer).

When the groupcast/broadcast L1 destination ID included in the $2^{nd}$ SCI transmitted by the TX UE matches the groupcast/broadcast L1 destination ID of the RX UE (e.g., the UE which has received the $2^{nd}$ SCI)

For example, the RX UE may be the P-UE (e.g., the power saving UE).

According to an embodiment of the present disclosure, for example, the P-UE may receive the $2^{nd}$ SCI for the purpose of sensing as well as monitoring the $2^{nd}$ SCI for data reception. In addition, for example, the P-UE may not perform the operation of monitoring SCI (e.g., $1^{st}$ SCI, $2^{nd}$ SCI) for data reception within the SL DRX inactive time. In addition, for example, the P-UE may not perform the operation of monitoring the SCI (e.g., $1^{st}$ SCI, $2^{nd}$ SCI) for data reception within the SL DRX inactive time but may perform the sensing even in the SL DRX inactive time duration. For example, the P-UE (e.g., the power saving UE, a pedestrian UE) or a V-UE (e.g., a vehicle UE) may perform the operation of monitoring the SCI (e.g., $1^{st}$ SCI, $2^{nd}$ SCI) for sensing even in the SL DRX inactive time duration.

According to an embodiment of the present disclosure, for example, in a case where the P-UE (e.g., the power saving UE) receives the $2^{nd}$ SCI within an SL DRX inactive time duration (e.g., a duration in which a sidelink signal for data reception of a counterpart UE of the P-UE is not necessarily to be monitored) in sidelink groupcast communication/sidelink broadcast communication, if the following case is satisfied, the P-UE may not (re)start the SL DRX timer (e.g., an SL DRX inactivity timer or an SL DRX HARQ RTT timer/SL DRX HARQ retransmission timer). For example, in a case where the P-UE (e.g., the power saving UE)

receives the $2^{nd}$ SCI within an SL DRX inactive time duration (e.g., a duration in which a sidelink signal for data reception of a counterpart UE of the P-UE is not necessarily to be monitored) in sidelink groupcast communication/sidelink broadcast communication, if the following case is satisfied, the P-UE may not (re)start the SL DRX timer (e.g., an SL DRX inactivity timer or an SL DRX HARQ RTT timer/SL DRX HARQ retransmission timer), the P-UE may receive data (e.g., packet data), based on the $2^{nd}$ SCI, and/or after completing the reception operation, and/or the P-UE may transmit the data to a higher layer (e.g., in case of a physical layer, a MAC layer, RLC layer, PDCP layer, and/or SDAP layer or the like which are higher layers of the physical layer).

Even if the groupcast/broadcast L1 destination ID included in the $2^{nd}$ SCI transmitted by the TX UE matches the groupcast/broadcast L1 destination ID of the RX UE (e.g., the UE which has received the $2^{nd}$ SCI), the P-UE may regard reception of the $2^{nd}$ SCI as not the operation for data reception but the operation for sensing, and the P-UE may not start the SL DRX timer (e.g., the SL DRX inactivity timer or the SL DRX HARQ RTT timer/SL DRX HARQ retransmission timer).

Even if the P-UE has received SCI (e.g., $1^{st}$ SCI, $2^{nd}$ SCI) transmitted by the TX UE, the P-UE may regard reception of the SCI as not an operation for data reception but an operation for sensing, and the P-UE may not start the SL DRX timer (e.g., the SL DRX inactivity timer or the SL DRX HARQ RTT timer/SL DRX HARQ retransmission timer). For example, even if the P-UE has received the SCI (e.g., $1^{st}$ SCI, $2^{nd}$ SCI) transmitted by the TX UE, irrespective of whether the groupcast/broadcast L1 destination ID matches/mismatches a groupcast/broadcast L1 destination ID of the P-UE (e.g., the UE which has received the SCI), the P-UE may regard reception of the SCI as not the operation for data reception but the operation for sensing, and the P-UE may not start the SL DRX timer (e.g., the SL DRX inactivity timer or the SL DRX HARQ RTT timer/SL DRX HARQ retransmission timer).

According to an embodiment of the present disclosure, new packet data for the RX UE, received within the SL DRX active time of the RX UE, and/or subsequent packet data may not be wasted. According to an embodiment of the present disclosure, the RX UE performs only reception/ monitoring of the sensing operation within the SL DRX inactive time and does not initiate the SL DRX timer, and thus the RX UE may save its power. According to an embodiment of the present disclosure, it is possible to solve a problem occurring when the RX UE randomly implements the SL DRX operation of the RX UE in a case where the RX UE performs the sensing operation based on the $2^{nd}$ SCI. For example, according to an embodiment of the present disclosure, the RX UE may not run the SL DRX timer unnecessarily even within the SL DRX inactive time. For example, according to an embodiment of the present disclosure, monitoring for data transmission of the TX UE may be concentrated within the SL DRX active time of the RX UE. For example, according to an embodiment of the present disclosure, data received unnecessarily in a state where the SL DRX timer is running may not be wasted even if it is the SL DRX inactive time of the RX UE.

According to an embodiment of the present disclosure, for example, in a case where the P-UE (e.g., the power saving UE) receives the $2^{nd}$ SCI within an SL DRX inactive time duration (e.g., a duration in which a sidelink signal for data reception of a counterpart UE of the P-UE is not necessarily to be monitored) in sidelink unicast communication, if the following case is satisfied, the P-UE may (re)start the SL DRX timer (e.g., an SL DRX inactivity timer or an SL DRX HARQ RTT timer/SL DRX HARQ retransmission timer).

When the L1 source ID included in the $2^{nd}$ SCI transmitted by the TX UE matches a partial bit of an L2 destination ID of the RX UE (e.g., the UE which has received the $2^{nd}$ SCI) while the L1 destination ID included in the $2^{nd}$ SCI transmitted by the TX UE matches a partial bit of the L2 source ID of the RX UE (e.g., the UE which has received the $2^{nd}$ SCI), the P-UE may regard reception of the SCI as not an operation for data reception but an operation for sensing, and/or the P-UE may not start the SL DRX timer (e.g., the SL DRX inactivity timer or the SL DRX HARQ RTT timer/SL DRX HARQ retransmission timer).

According to an embodiment of the present disclosure, for example, in a case where the P-UE (e.g., the power saving UE) receives the $2^{nd}$ SCI for sensing within an SL DRX inactive time duration (e.g., a duration in which a sidelink signal for data reception of a counterpart UE of the P-UE is not necessarily to be monitored) in sidelink groupcast communication/sidelink broadcast communication, if the following case is satisfied, the P-UE may (re)start the SL DRX timer (e.g., an SL DRX inactivity timer or an SL DRX HARQ RTT timer/SL DRX HARQ retransmission timer).

When the groupcast/broadcast L1 destination ID included in the $2^{nd}$ SCI transmitted by the TX UE matches the groupcast/broadcast L1 destination ID of the RX UE (e.g., the UE which has received the $2^{nd}$ SCI), the P-UE may regard reception of the $2^{nd}$ SCI as not the operation for data reception but the operation for sensing, and and/or the P-UE may not start the SL DRX timer (e.g., the SL DRX inactivity timer or the SL DRX HARQ RTT timer/SL DRX HARQ retransmission timer).

According to an embodiment of the present disclosure, packet data for the RX UE, received outside the SL DRX active time of the RX UE, may not be wasted.

The proposal of the present disclosure can be applied and extended to a method for solving a problem in which loss occurs due to an interruption occurring during Uu BWP switching. In addition, the proposal of the present disclosure can be applied and extended to a method to solve the problem of loss due to interruption occurring during SL BWP switching when (e.g., a plurality of) SL BWPs are supported for the UE.

The proposal of the present disclosure may be extended and applied to parameters (e.g., timers) included in UE-pair specific SL DRX configuration, UE-pair specific SL DRX pattern, or UE-pair specific SL DRX configuration, in addition to parameters (e.g. timers) included in default/common SL DRX configuration, default/common SL DRX patterns, or default/common SL DRX configuration. In addition, an on-duration mentioned in the proposal of the present disclosure can be extended and interpreted as an active time period (e.g., time to wake-up state (e.g., RF module turned on) to receive/transmit radio signals), an off-duration may be extended and interpreted as a sleep time (e.g., a time for operating in a sleep mode state (e.g., a state in which an RF module is turned off) for power saving). It does not mean that a TX UE is obligated to operate in a sleep mode in a sleep time interval. If necessary, a TX UE may be allowed to operate in an active time for a while for a sensing operation and/or a transmission operation even in sleep time.

For example, whether the (part of) proposed method/rule of the present disclosure is applied and/or a related parameter (e.g., threshold) may be configured specifically (or differently or independently) for a resource pool. For example, whether the (part of) proposed method/rule of the present disclosure is applied and/or a related parameter (e.g., threshold) may be configured specifically (or differently or independently) for congestion level. For example, whether the (part of) proposed method/rule of the present disclosure is applied and/or a related parameter (e.g., threshold) may be configured specifically (or differently or independently) for a priority of a service. For example, whether the (part of) proposed method/rule of the present disclosure is applied and/or a related parameter (e.g., threshold) may be configured specifically (or differently or independently) for a service type. For example, whether the (part of) proposed method/rule of the present disclosure is applied and/or a related parameter (e.g., threshold) may be configured specifically (or differently or independently) for a QoS requirement (e.g., latency, reliability). For example, whether the (part of) proposed method/rule of the present disclosure is applied and/or a related parameter (e.g., threshold) may be configured specifically (or differently or independently) for PQI(5QI(5G QoS identifier) for PC5). For example, whether the (part of) proposed method/rule of the present disclosure is applied and/or a related parameter (e.g., threshold) may be configured specifically (or differently or independently) for a traffic type (e.g., a periodic generation or an aperiodic generation). For example, whether the (part of) proposed method/rule of the present disclosure is applied and/or a related parameter (e.g., threshold) may be configured specifically (or differently or independently) for an SL transmission resource allocation mode (e.g., mode 1 or mode 2).

For example, whether the proposed rule of the present disclosure is applied and/or related parameter setting values may be configured specifically (or differently or independently) for a resource pool. For example, whether the proposed rule of the present disclosure is applied and/or related parameter setting values may be configured specifically (or differently or independently) for a type of service/packet. For example, whether the proposed rule of the present disclosure is applied and/or related parameter setting values may be configured specifically (or differently or independently) for a priority of service/packet. For example, whether the proposed rule of the present disclosure is applied and/or related parameter setting values may be configured specifically (or differently or independently) for QoS requirements (e.g., URLLC/EMBB traffic, reliability, latency). For example, whether the proposed rule of the present disclosure is applied and/or related parameter setting values may be configured specifically (or differently or independently) for PQI. For example, whether the proposed rule of the present disclosure is applied and/or related parameter setting values may be configured specifically (or differently or independently) for a cast type (e.g., unicast, groupcast, broadcast). For example, whether the proposed rule of the present disclosure is applied and/or related parameter setting values may be configured specifically (or differently or independently) for (resource pool) congestion level (e.g., CBR). For example, whether the proposed rule of the present disclosure is applied and/or related parameter setting values may be configured specifically (or differently or independently) for SL HARQ feedback scheme (e.g., NACK-only feedback, ACK/NACK feedback). For example, whether the proposed rule of the present disclosure is applied and/or related parameter setting values may be configured specifically (or differently or independently) for HARQ Feedback Enabled MAC PDU transmission. For example, whether the proposed rule of the present disclosure is applied and/or related parameter setting values may be configured specifically (or differently or independently) for HARQ Feedback Disabled MAC PDU transmission. For example, whether the proposed rule of the present disclosure is applied and/or related parameter setting values may be configured specifically (or differently or independently) for whether PUCCH-based SL HARQ feedback reporting operation is set. For example, whether the proposed rule of the present disclosure is applied and/or related parameter setting values may be configured specifically (or differently or independently) for a resource reselection based on pre-emption or pre-emption. For example, whether the proposed rule of the present disclosure is applied and/or related parameter setting values may be configured specifically (or differently or independently) for a re-evaluation or re-selection of resources based on re-evaluation. For example, whether the proposed rule of the present disclosure is applied and/or related parameter setting values may be configured specifically (or differently or independently) for (L2 or L1) (source and/or destination) identifier. For example, whether the proposed rule of the present disclosure is applied and/or related parameter setting values may be configured specifically (or differently or independently) for (L2 or L1) (Combination of Source ID and Destination ID) Identifier. For example, whether the proposed rule of the present disclosure is applied and/or related parameter setting values may be configured specifically (or differently or independently) for (L2 or L1) (a combination of source ID and destination ID pair and cast type) identifier. For example, whether the proposed rule of the present disclosure is applied and/or related parameter setting values may be configured specifically (or differently or independently) for the direction of a pair of source layer ID and destination layer ID. For example, whether the proposed rule of the present disclosure is applied and/or related parameter setting values may be configured specifically (or differently or independently) for PC5 RRC connection/link. For example, whether the proposed rule of the present disclosure is applied and/or related parameter setting values may be configured specifically (or differently or independently) for the case of performing SL DRX. For example, whether the proposed rule of the present disclosure is applied and/or related parameter setting values may be configured specifically (or differently or independently) for SL mode type (e.g., resource allocation mode 1 or resource allocation mode 2). For example, whether the proposed rule of the present disclosure is applied and/or related parameter setting values may be configured specifically (or differently or independently) for a case of performing (a)periodic resource reservation.

The certain time referred to in the proposal of the present disclosure may refer to a time during which a UE operates as an active time for a predefined time in order to receive a sidelink signal or sidelink data from a counterpart UE. A certain time referred to in the proposal of the present disclosure may refer to a time during which a UE operates as an active time for a specific timer (e.g., a sidelink DRX retransmission timer, a sidelink DRX inactivity timer, or a timer that guarantees operation as active time in DRX operation of an RX UE) time in order to receive a sidelink signal or sidelink data from a counterpart UE. In addition, whether the proposal and proposal rule of the present disclosure are applied (and/or related parameter setting values) may also be applied to mmWave SL operation.

FIG. 11 shows a method in which a first device performs wireless communication, according to an embodiment of the present disclosure. The embodiment of FIG. 11 may be combined with various embodiments of the present disclosure.

Referring to FIG. 11, in step S1110 , the first device may obtain a sidelink (SL) discontinuous reception (DRX) configuration including information related to an active time of the first device. In step S1120, the first device may receive first sidelink control information (SCI) for scheduling of a first physical sidelink shared channel (PSSCH) and second SCI from a second device through a first physical sidelink control channel (PSCCH), outside the active time of the first device. In step S1130, the first device may receive the second SCI including information related to a source identity (ID) of the second device and information related to a destination ID of the second device from the second device through the first PSCCH, outside the active time of the first device. For example, an SL DRX timer may not be started by the first device, based on that the source ID of the second ID matches a destination ID of the first ID and the destination ID of the second device matches a source ID of the first device.

Additionally or alternatively, the first SCI and the second SCI may be information received to perform sensing outside the active time of the first device.

Additionally or alternatively, the first SCI and second SCI received outside the active time of the first device may not be control information for receiving packet data.

Additionally or alternatively, the method may further include: receiving third SCI for scheduling a second PSSCH and fourth SCI from a third device through a second PSCCH, within the active time of the first device; and receiving the fourth SCI including information related to a source ID of the third device and information related to a destination ID of the third device from the third device, within the active time of the first device.

Additionally or alternatively, the source ID of the third device may be started by the first device, based on that the source ID of the third device matches the destination ID of the first device and the destination ID of the third device matches the source ID of the first device Additionally or alternatively, the third SCI and fourth SCI received within the active time of the first device may be information received to perform sensing within the active time of the first device, and may be control information for receiving packet data.

Additionally or alternatively, the method may further include determining whether the source ID of the second device matches the destination ID of the first device and the destination ID of the second device matches the source ID of the first device.

Additionally or alternatively, the method may further include establishing an SL unicast link between the second device and the first device.

Additionally or alternatively, the SL DRX timer may be at least one of an SL DRX inactivity timer, an SL DRX hybrid automatic repeat request (HARQ) round-trip time (RTT) timer, and an SL DRX retransmission timer.

Additionally or alternatively, the active time of the first device may be a time at which at least one of an SL DRX on-duration timer, an SL DRX inactivity timer, and an SL DRX retransmission timer is running.

Additionally or alternatively, the method may further include receiving data related to the second SCI, based on that the source ID of the second device matches the destination ID of the first device and the destination ID of the second device matches the source ID of the first device.

Additionally or alternatively, the data may be transferred to at least one higher layer of the first device.

Additionally or alternatively, the proposed method may be applied to an apparatus according to various embodiments of the present disclosure. First, the processor 102 of the first device 100 may obtain an SL DRX configuration including information related to an active time of a first UE. In addition, the processor 102 of the first device 100 may control the transceiver 106 to receive first SCI for scheduling a first PSSCH and second SCI from a second UE through a first PSCCH, outside the active time of the first UE. In addition, the processor 102 of the first device 100 may control the transceiver 106 to receive the second SCI including information related to a source ID of the second UE and information related to a destination ID of the second UE from the second device through the first PSSCH, outside the active time of the first UE. For example, an SL DRX timer may not be started by the first UE, based on that the source ID of the second UE matches a destination ID of the first UE and the destination ID of the second UE matches a source ID of the first UE.

According to an embodiment of the present disclosure, a first device performing wireless communication may be provided. For example, the first device may include: one or more memories storing instructions; one or more transceivers; and one or more processors coupling the one or more memories and the one or more transceivers. The one or more processors may execute the instructions to: obtain an SL DRX configuration including information related to an active time of the first device; receive first SCI for scheduling a first PSSCH and second SCI from a second device through a first PSCCH, outside the active time of the first device; and receive the second SCI including information related to a source ID of the second device and information related to a destination ID of the second device from the second device through the first PSSCH, outside the active time of the first device. For example, an SL DRX timer may not be started by the first device, based on that the source ID of the second device matches a destination ID of the first device and the destination ID of the second device matches a source ID of the first device.

According to an embodiment of the present disclosure, an apparatus configured to control a first UE may be provided. For example, the apparatus may include: one or more memories operatively coupled by the one or more processors and storing instructions. The one or more processors may execute the instructions to: obtain an SL DRX configuration including information related to an active time of the first UE; receive first SCI for scheduling a first PSSCH and second SCI from a second UE through a first PSCCH, outside the active time of the first UE; and receive the second SCI including information related to a source ID of the second UE and information related to a destination ID of the second UE from the second device through the first PSSCH, outside the active time of the first UE. For example, an SL DRX timer may not be started by the first UE, based on that the source ID of the second UE matches a destination ID of the first UE and the destination ID of the second UE matches a source ID of the first UE.

According to an embodiment of the present disclosure, a non-transitory computer-readable medium having instructions recorded thereon may be proposed. The instruction, when executed by one or more processors, may cause the one or more processors to: obtain an SL DRX configuration including information related to an active time of the first device; receive first SCI for scheduling a first PSSCH and second SCI from a second device through a first PSCCH, outside the active time of the first device; and receive the second SCI including information related to a source ID of the second device and information related to a destination ID of the second device from the second device through the first PSSCH, outside the active time of the first device. Herein, an SL DRX timer may not be started by the first device, based on that the source ID of the second device matches a destination ID of the first device and the destination ID of the second device matches a source ID of the first device.

FIG. 12 shows a method in which a second device performs wireless communication, according to an embodiment of the present disclosure. The embodiment of FIG. 12 may be combined with various embodiments of the present disclosure.

Referring to FIG. 12, in step S1210, the second device may obtain a sidelink (SL) discontinuous reception (DRX) configuration including information related to an active time of the first device. In step S1220, the second device may transmit first sidelink control information (SCI) for scheduling of a first physical sidelink shared channel (PSSCH) and second SCI to the first device through a first physical sidelink control channel (PSCCH), outside the active time of the first device. In step S1230, the second device may transmit the second SCI including information related to a source identity (ID) of the second device and information related to a destination ID of the second device to the first device through the first PSSCH, outside the active time of the first device. For example, an SL DRX timer may not be started by the first device, based on that the source ID of the second ID matches a destination ID of the first ID and the destination ID of the second device matches a source ID of the first device.

The proposed method may be applied to an apparatus according to various embodiments of the present disclosure. First, the processor 202 of the second device 200 may obtain an SL DRX configuration including information related to an active time of a first device. In addition, the processor 202 of the second device 200 may control the transceiver 206 to transmit first SCI for scheduling a first PSSCH and second SCI to the first device through a first PSCCH, outside the active time of the first device. In addition, the processor 202 of the second device 200 may control the transceiver 206 to transmit the second SCI including information related to a source ID of the second device and information related to a destination ID of the second device to the first device through the first PSSCH, outside the active time of the first device. For example, an SL DRX timer may not be started by the first device, based on that the source ID of the second device matches a destination ID of the first device and the destination ID of the second device matches a source ID of the first device.

According to an embodiment of the present disclosure, a second device performing wireless communication may be provided. The second device may include: one or more memories storing instructions; one or more transceivers; and one or more processors coupling the one or more memories and the one or more transceivers. The one or more processors may execute the instructions to obtain an SL DRX configuration including information related to an active time of a first device, transmit first SCI for scheduling a first PSSCH and second SCI to the first device through a first PSCCH, outside the active time of the first device, and transmit the second SCI including information related to a source ID of the second device and information related to a destination ID of the second device to the first device through the first PSSCH, outside the active time of the first device. For example, an SL DRX timer may not be started by the first device, based on that the source ID of the second device matches a destination ID of the first device and the destination ID of the second device matches a source ID of the first device.

According to an embodiment of the present disclosure, an apparatus configured to control a second UE may be provided. For example, the apparatus may include: one or more memories operatively coupled by the one or more processors and storing instructions. The one or more processors may execute the instructions to obtain an SL DRX configuration including information related to an active time of a first UE, transmit first SCI for scheduling a first PSSCH and second SCI to a first UE through a first PSCCH, outside the active time of the first UE, and transmit the second SCI including information related to a source ID of the second UE and information related to a destination ID of the second UE to the second UE through the first PSSCH, outside the active time of the first UE. For example, an SL DRX timer may not be started by the first UE, based on that the source ID of the second UE matches a destination ID of the first UE and the destination ID of the second UE matches a source ID of the first UE.

According to an embodiment of the present disclosure, a non-transitory computer-readable medium having instructions recorded thereon may be proposed. The instruction, when executed by one or more processors, may cause the one or more processors to obtain an SL DRX configuration including information related to an active time of the first device, transmit first SCI for scheduling a first PSSCH and second SCI to a first device through a first PSCCH, outside the active time of the first device, and transmit the second SCI including information related to a source ID of the second device and information related to a destination ID of the second UE to the second device through the first PSSCH, outside the active time of the first UE. For example, an SL DRX timer may not be started by the first device, based on that the source ID of the second device matches a destination ID of the first device and the destination ID of the second device matches a source ID of the first device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
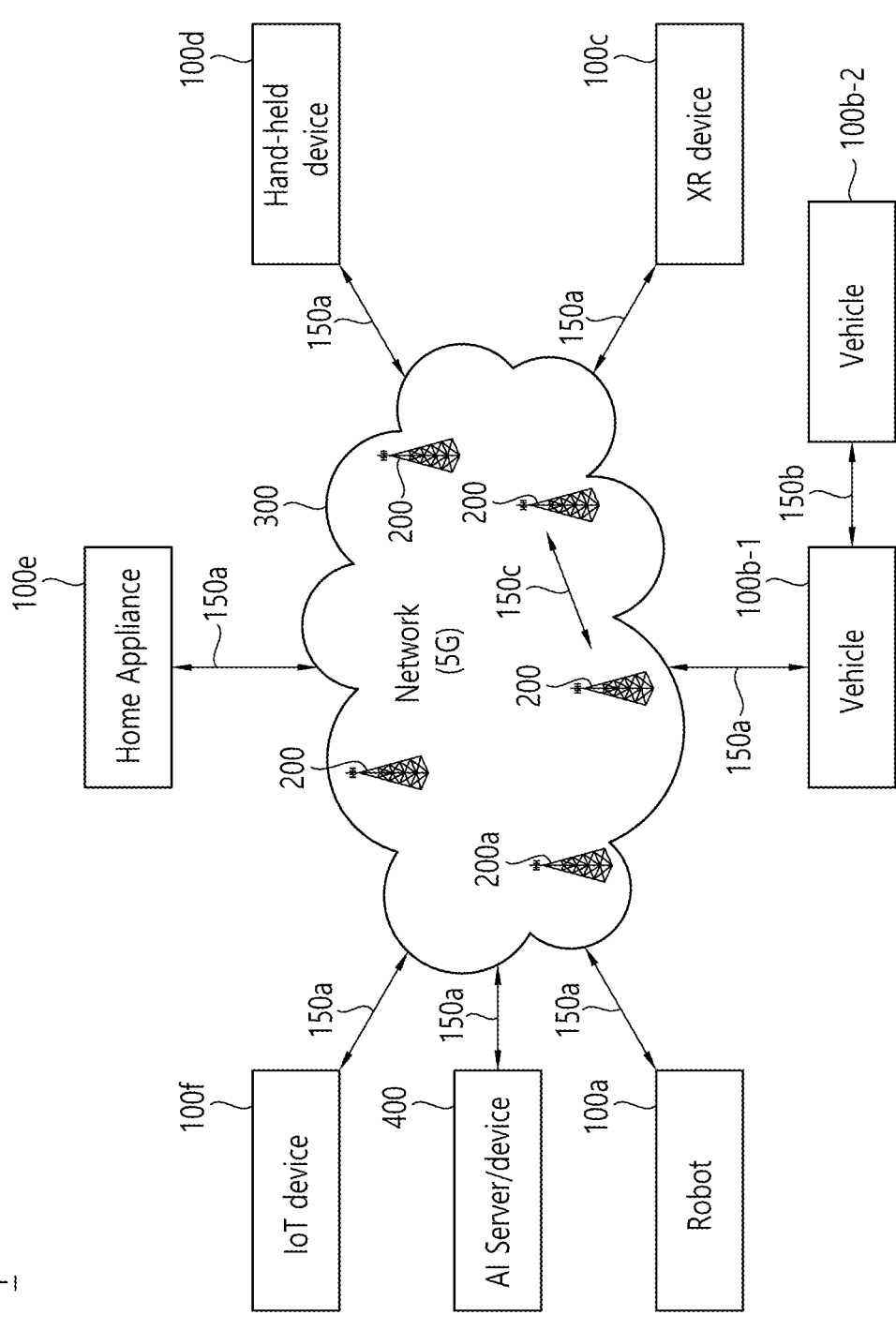
FIG. 13 shows a communication system 1, based on an embodiment of the present disclosure.

FIG. 13 shows a communication system 1, based on an embodiment of the present disclosure. The embodiment of FIG. 13 may be combined with various embodiments of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
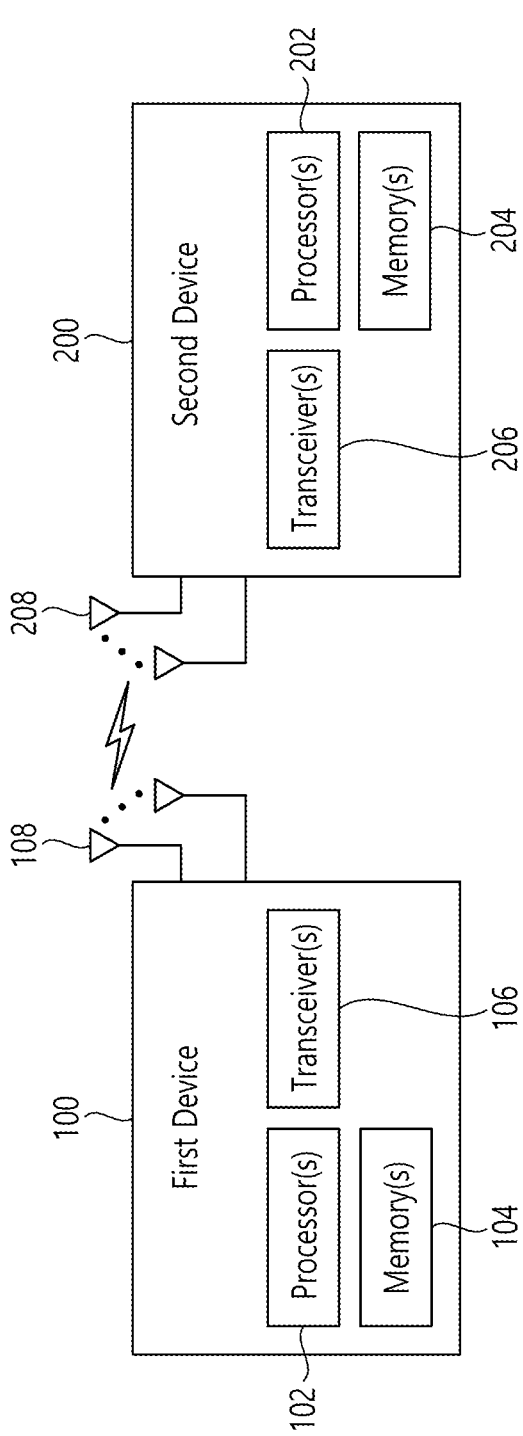
FIG. 14 shows wireless devices, based on an embodiment of the present disclosure.

FIG. 14 shows wireless devices, based on an embodiment of the present disclosure. The embodiment of FIG. 14 may be combined with various embodiments of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and at least one memory 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and at least one memory 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
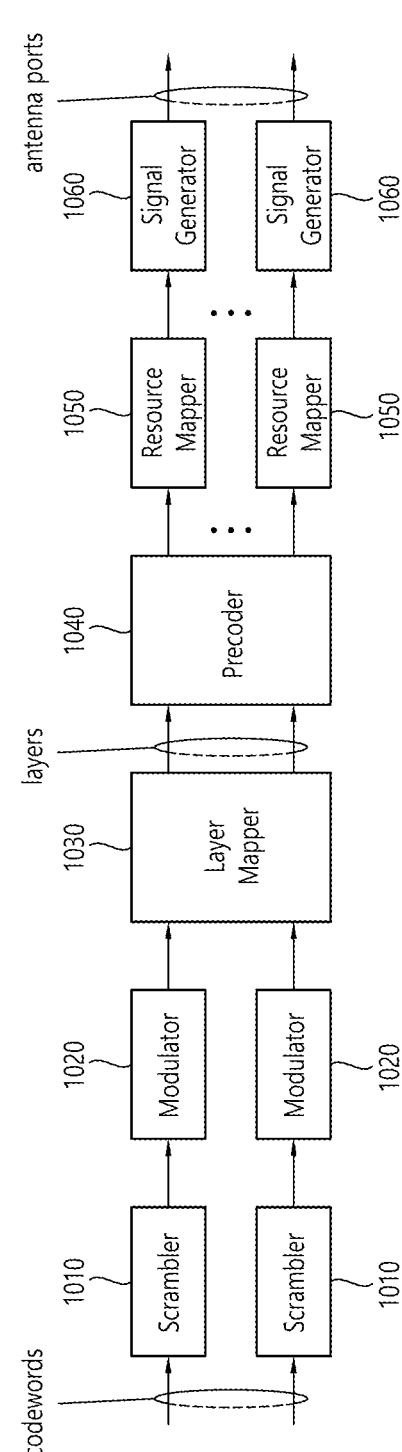
FIG. 15 shows a signal process circuit for a transmission signal, based on an embodiment of the present disclosure.

FIG. 15 shows a signal process circuit for a transmission signal, based on an embodiment of the present disclosure. The embodiment of FIG. 15 may be combined with various embodiments of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT)

modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
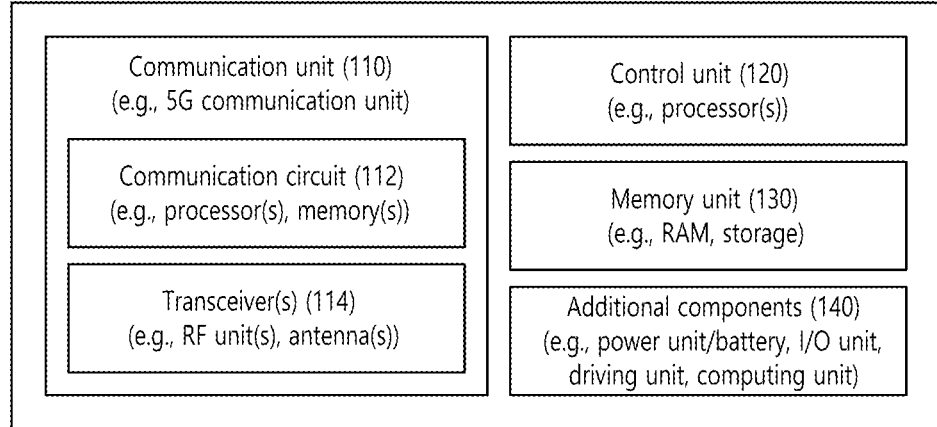
FIG. 16 shows another example of a wireless device, based on an embodiment of the present disclosure.

FIG. 16 shows another example of a wireless device, based on an embodiment of the present disclosure. The wireless device may be implemented in various forms according to a use-case/service (refer to FIG. 13). The embodiment of FIG. 16 may be combined with various embodiments of the present disclosure.

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
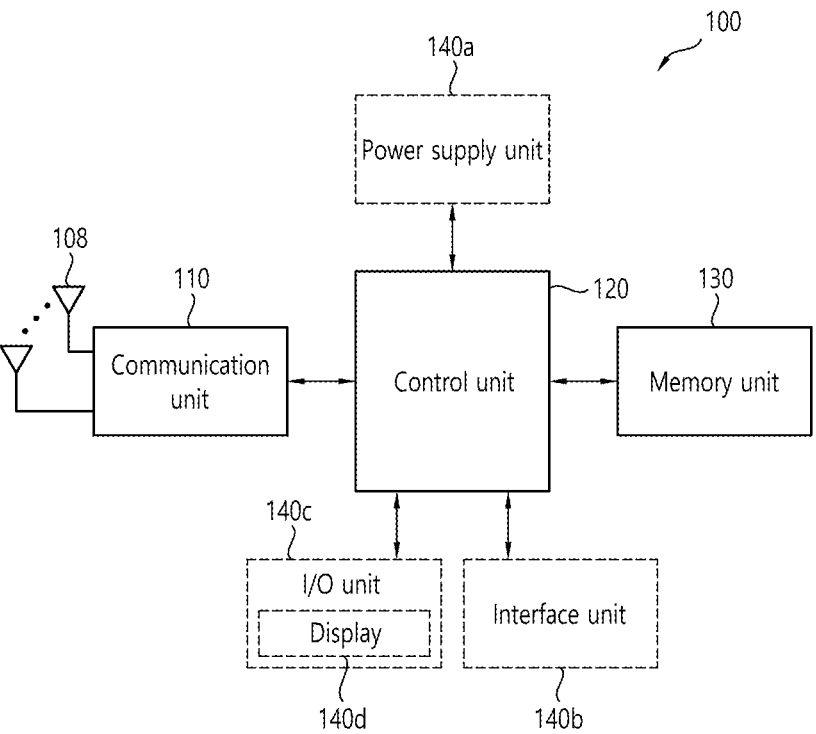
FIG. 17 shows a hand-held device, based on an embodiment of the present disclosure.

FIG. 17 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 17 may be combined with various embodiments of the present disclosure.

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140*c*.

FIG. 18 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 18 may be combined with various embodiments of the present disclosure.

Referring to FIG. 18, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
obtaining, by a first device, a sidelink (SL) discontinuous reception (DRX) configuration including information related to an active time of the first device,
wherein the active time includes a duration in which an SL DRX timer runs based on a reception of at least one of first sidelink control information (SCI) or second SCI;
receiving, by the first device, from a second device, the first SCI for scheduling of a first physical sidelink shared channel (PSSCH) and the second SCI through a first physical sidelink control channel (PSCCH);
receiving, by the first device, from the second device, the second SCI including information related to a source identity (ID) of the second device and information related to a destination ID of the second device through the first PSSCH; and
determining to skip a start of the SL DRX timer, based on (i) that the second SCI is received within an inactive time of the first device and (ii) that the source ID of the second device matches a destination ID of the first device and the destination ID of the second device matches a source ID of the first device,
wherein the inactive time of the first device is a duration outside the active time.

2. The method of claim 1, wherein, based on the at least one of the first SCI or the second SCI being received within the inactive time of the first device, the reception of the at least one of the first SCI or the second SCI is determined as a reception to perform sensing for a resource selection.

3. The method of claim 1, wherein, based on the at least one of the first SCI or the second SCI being received within the inactive time of the first device, the reception of the at least one of the first SCI or the second SCI is not determined as a reception for receiving data.

4. The method of claim 1, further comprising:
receiving, from a third device, third SCI for scheduling of a second PSSCH and fourth SCI through a second PSCCH; and
receiving, from the third device, the fourth SCI including information related to a source ID of the third device and information related to a destination ID of the third device through the second PSSCH.

5. The method of claim 4,
wherein the SL DRX timer is started by the first device, based on (i) that the fourth SCI is received within the active time of the first device and (ii) that the source ID of the third device matches the destination ID of the first device and the destination ID of the third device matches the source ID of the first device.

6. The method of claim 5, wherein, based on at least one of the third SCI or the fourth SCI being received within the active time of the first device, the reception of the at least one of the third SCI or the fourth SCI is determined as a reception for receiving data.

7. The method of claim 1, further comprising:
establishing an SL unicast link between the second device and the first device.

8. A first device comprising:
one or more memories storing instructions;
one or more transceivers; and
one or more processors coupling the one or more memories and the one or more transceivers, wherein the one or more processors execute the instructions to:
obtain a sidelink (SL) discontinuous reception (DRX) configuration including information related to an active time of the first device;
wherein the active time includes a duration in which an SL DRX timer runs based on a reception of at least one of first sidelink control information (SCI) or second SCI;
receive, from a second device, first sidelink control information (SCI) for scheduling of a first physical sidelink shared channel (PSSCH) and second SCI through a first physical sidelink control channel (PSCCH);
receive, from the second device, the second SCI including information related to a source identity (ID) of the second device and information related to a destination ID of the second device through the first PSSCH; and
determine to skip a start of the SL DRX timer, based on (i) that the second SCI is received within an inactive time of the first device and (ii) that the source ID of the second device matches a destination ID of the first device and the destination ID of the second device matches a source ID of the first device,
wherein the inactive time of the first device is a duration outside the active time.

9. The first device of claim 8, wherein, based on the at least one of the first SCI or the second SCI being received within the inactive time of the first device, the reception of the at least one of the first SCI or the second SCI is determined as a reception to perform sensing for a resource selection.

10. The first device of claim 8, wherein, based on the at least one of the first SCI or the second SCI being received within the inactive time of the first device, the reception of the at least one of the first SCI or the second SCI is not determined as a reception for receiving data.

11. The first device of claim 8, the instructions further comprising instructions for:

receiving, from a third device, third SCI for scheduling of a second PSSCH and fourth SCI through a second PSCCH; and receiving, from the third device, the fourth SCI including information related to a source ID of the third device and information related to a destination ID of the third device.

12. The first device of claim 11, wherein the SL DRX timer is started by the first device, based on (i) that the fourth SCI is received within the active time of the first device and (ii) that the source ID of the third device matches the destination ID of the first device and the destination ID of the third device matches the source ID of the first device.

13. The first device of claim 12, wherein, based on at least one of the third SCI or the fourth SCI being received within the active time of the first device, the reception of the at least one of the third SCI or the fourth SCI is determined as a reception for receiving data.

14. The first device of claim 8, the instructions further comprising instructions for:
establishing an SL unicast link between the second device and the first device.

15. An apparatus configured to control a first UE, comprising:
one or more processors; and
one or more memories operatively coupled by the one or more processors and storing instructions, wherein the one or more processors execute the instructions to:
obtain a sidelink (SL) discontinuous reception (DRX) configuration including information related to an active time of the first UE;
wherein the active time includes a duration in which an SL DRX timer runs based on a reception of at least one of first sidelink control information (SCI) or second SCI;
receive, from a second device, first sidelink control information (SCI) for scheduling of a first physical sidelink shared channel (PSSCH) and second SCI through a first physical sidelink control channel (PSCCH);
receive, from the second device, the second SCI including information related to a source identity (ID) of the second UE and information related to a destination ID of the second UE through the first PSSCH; and
determine to skip a start of the SL DRX timer, based on (i) that the second SCI is received within an inactive time of the first device and (ii) that the source ID of the second device matches a destination ID of the first device and the destination ID of the second device matches a source ID of the first device,
wherein the inactive time of the first device is a duration outside the active time.

* * * * *